358-86. OR 3,814,841 SR

United States Patent [19]

Ulicki

[11] 3,814,841

[45] June 4, 1974

[54] COMMUNICATION SYSTEM WITH PREMISES ACCESS MONITORING

[75] Inventor: Edward M. Ulicki, East Paterson, N.J.

[73] Assignee: Telebeam Corporation, New York, N.Y.

[22] Filed: Oct. 2, 1972

[21] Appl. No.: 294,310

Related U.S. Application Data

[63] Continuation-in-part of Ser. No. 235,167, March 16, 1972, Pat. No. 3,757,225.

[52] U.S. Cl. .......... 178/5.1, 325/308, 235/61.11 E, 340/149 R

[51] Int. Cl. .......... H04n 1/44, H04q 5/00

[58] Field of Search ...... 178/5.1, DIG. 13; 325/308; 235/61.11 E; 340/149 A, 274, 258 B, 149 R

[56] References Cited

UNITED STATES PATENTS

| | | | |
|---|---|---|---|
| 3,078,337 | 2/1963 | Shanahan et al. | 178/5.1 |
| 3,403,380 | 9/1968 | Welch | 340/149 A |
| 3,612,888 | 10/1971 | Boucher | 235/61.11 E |
| 3,668,307 | 6/1972 | Face et al. | 325/308 |
| 3,694,810 | 9/1972 | Mullens et al. | 340/149 R |

*Primary Examiner*—Malcolm F. Hubler
*Assistant Examiner*—S. C. Buczinski
*Attorney, Agent, or Firm*—Hubbell, Cohen & Stiefel

[57] ABSTRACT

A communication system by which a plurality of substantially simultaneously transmitted different subscription programs may be selectively individually displayed on a common display channel provides premises access monitoring in addition to such display. A multiplexed communication signal containing a plurality of different program information signals and a plurality of command signals is provided to a plurality of display devices which are capable of substantially simultaneously displaying different selected program information displays from the plurality of such signals in response to selected program information signals. Each display device has an associated means for controlling the selection of these programs which is connected to a common condition responsive means, such as a computer. The control means includes means for demultiplexing the communication signal and for generating a given program information selection control signal in response to a uniquely identified command signal which control signal, when mixed with the demultiplexed plurality of subscription program information signals, provides the selected one at the frequency of the common display channel. The computer and common communication signal path thereto are utilized to provide premises access monitoring, in which instance an optical card reader utilizing fiber optics provides input conditions to the computer indicative of both the status of the door to the premises and the authorization of the entrant, a randomly selected insertable card providing the information to the computer through the reader. Such reader may employ a modulated light source, light polarization, or space and/or time diversity in order to increase the security of the reader. In addition, a pair of separate input devices, such as a card reader and a door position sensor may be utilized for such monitoring.

32 Claims, 13 Drawing Figures

COMMUNICATION SYSTEM WITH PREMISES ACCESS MONITORING

CROSS-REFERENCE TO RELATED APPLICATIONS

This application is a continuation-in-part of my co-pending U.S. Pat. application Ser. No. 235,167, now Pat. No. 3,757,225, filed Mar. 16, 1972, and entitled COMMUNICATION SYSTEM.

BACKGROUND OF THE INVENTION

1. Field of the Invention

The present invention relates to communication systems in which premises surveillance information is provided and such systems in which both subscription program information and premises surveillance information is provided.

2. Description of the Prior Art

Subscription communication systems, such as those which are commonly provided under the name "pay TV systems" are well known. These systems, however, have not enjoyed the widespread acceptance which was originally contemplated therefor due to considerable problems associated with insuring the security of the pay TV signal as well as attempting to provide a diverse enough selection to interest potential subscribers. With the advent of cable television, commonly known as CATV, subscription television has become more popular although still being unable to provide a larger diversity than the number of unused VHF channels on a commercial television set which, in an area like New York City, consists of only channels 3, 6, 8, 10 and 12. Thus, at best, a selection of only five simultaneously transmitted pay TV programs can be provided, assuming, as is the usual case, the subscriber also wishes to receive the "free TV," normally transmitted over the remaining channels.

Such program capacity enhancement CATV systems are exemplified by U.S. Pat. Nos. 3,581,209 and 3,562,650 which disclose CATV program capacity enhancement systems. In these systems, an entire band or group of transmitted signals is simultaneously converted to the unused band of television channels. However, only one program is transmitted over one channel, a separate channel being required for each of the transmitted pay TV programs. Thus, since the signals are group converted, these systems are restricted to the number of unused channels available on the subscriber's television set.

In addition, subscription television systems, such as that disclosed in U.S. Pat. Nos. 3,230,302 and 3,278,677, wherein central control of a plurality of subscribers' television sets is provided, require that each subscriber have his own unique command channel frequency. This provides an undesirable limitation on the number of subscribers. Furthermore, some prior art systems, such as that disclosed in U.S. Pat. No. 3,230,302, merely provide monitoring of subscriber program selection for subsequent billing. There is no positive control of subscriber program selection. Thus, such prior art systems normally require remote location of a monitoring unit or security unit so as to ensure the security thereof.

The majority of presently available prior art subscription television systems require modification of the subscriber's TV receiver, such as for use with a coin box control. An example of such a system is disclosed in U.S. Pat. No. 3,355,546. Thus, these undesirable limitations on subscription television systems have contributed to restricting the growth of this market.

Prior art systems for providing premises surveillance information have primarily consisted of hard-wired electronic alarm systems which only provide information as to the fact that the monitored premises have been entered. Such an alarm is normally given whether or not an authorized person has entered such premises unless such person turns off the alarm. This often results in false alarms which can be costly and time consuming in enforcing a proper surveillance system. Where the identity of the occupant of the monitored premises changes frequently, such as in a hotel environment, it is not practical or is it good security procedure to inform each occupant of the premises as to how to turn off the alarm. In addition, such information may inadvertently become widely disseminated and thus comprise the security of the system. Such prior art systems do not enable a random change in the proper authorization code for entry to the monitored premises in accordance with a change in occupant nor do they enable a proper authorized entrant to enter the premises without the use of an authorization code which must be known to the occupant. Accordingly, such systems may be easily compromised and, thus, prior art premises access monitoring systems for environments wherein the identity of the occupant is frequently changed have not been satisfactory. Furthermore, there are no satisfactory systems of this type which are operatively linked through a subscription communication system to a common computer which enables both secure program selection and premises access monitoring.

These disadvantages of the prior art are overcome by the present invention.

SUMMARY OF THE INVENTION

A communication system by which both a plurality of substantially simultaneously transmitted different subscription programs may be selectively individually displayed on a common display channel and premises access monitoring may be provided is provided. Each of the subscription programs preferably has a different associated frequency which is also different from the associated frequency of the common display channel. A multiplexed communication signal contains a plurality of different program information signals of different frequencies and a plurality of command signals and is received by a plurality of display devices which are capable of displaying different selected subscription program information displays from the plurality of such signals in response to selected program information signals. The communication signal path acts as a common communication path for both the program information signals and the command signals.

Each display device has an associated control means for controlling the selection of the programs. This control means is connected to a common condition responsive means, such as a computer which supervises the program selection and preferably automatically bills for such selection on a program by program basis as well as functioning as an integral part of the premises access monitoring system for providing alerts of unauthorized entry to monitored premises in accordance with information provided via the common communication signal path to the computer. The control means includes demultiplexer means for separating the multiplexed communication signal into the plurality of program information signals and the plurality of command signals, and associated program information selection control signal generating means operatively connected to the signal separation means for providing a program selection control signal in response to an associated unique command signal from the computer. The control means further includes an associated signal operating means operatively connected to the signal separating means and the program selection control signal generating means for operating on the plurality of subscription program information signals with the associated program selection control signal for providing one of the selected program information signals to the display means at the associated common display signal frequency. Thus, the control means demultiplexes the communication signal and generates a program information selection control signal in response to a uniquely identified command signal.

A digital frequency synthesizer, such as one employing a crystal reference oscillator and a phase locked loop having a voltage controlled oscillator therein, is preferably utilized to generate the control signal at a frequency which, when mixed with the demultiplexed plurality of program information signals, will provide the selected program at the frequency of the common display channel. A different program may be substantially simultaneously selected on another display device in the same manner by the generation of a different control signal mixing frequency in response to a different associated unique command signal detected by the display device associated control means.

The plurality of subscription program information signals may also comprise a digital time division multiplexed signal in which instance a digital sampler, such as a recirculating register, may be utilized in conjunction with a comparator to time demultiplex these program information signals and provide the selected program in response to the generation of an unload signal from the comparator as the selection control signal. The digital output of the sampler, which is the selected program, is thereafter converted to an analog signal, such as by a digital-to-analog converter utilizing a flip-flop memory hold circuit. If the communication system is utilized for subscription or pay television, the video portion of the program information may be provided via a frequency multiplexed signal which is demultiplexed and the appropriate program video portion selected by means of manually tuning to an oscillator having the appropriate mixing frequency which when mixed with the plurality of video information signals will provide the selected signal at the frequency of the common display channel. The audio portion of such a signal may be the above digital time division multiplexed signal and the appropriate audio information signal corresponding to the selected program video information signal may be selected in the manner previously described above with reference to sampling of the plurality of time division multiplex program information signals. Thereafter, the audio information signal is combined with the selected program video information signal to provide the selected composite program information signal at the common display channel frequency.

The system computer and its associated common communication signal path to the associated control means are utilized to provide premises access monitoring in addition to program selection. In such instance, an optical card reader utilizing fiber optics provides input conditions to the computer indicative of both the status of the door to the premises and the authorization of the entrant. A randomly selected insertable card having an authorization code or identity code encoded thereon provides the identity authorization information to the computer through the card reader. The optical card reader preferably consists of two portions which are optically aligned and interconnected through fiber optics. One portion is located in the door to the premises and the other portion is preferably located in the portion of the wall or door jamb opposite the portion in the door. One of these portions contains a light transmission device, such as a light emitting diode, and the other portion contains means for receiving the card to be read. As was previously mentioned, fiber optics interconnect these two portions so that the light transmitted will be directed by fiber optics to code reading positions on the card and therefrom to a logic network, also located in the portion containing the light transmitter, which logic network "reads" the card, formats this information and transmits it via the common communication signal path to the associated control means and therefrom to the system computer which compares this information with the stored authorization code for the particular premises being monitored. The door position information is provided to the computer due to the optical alignment of the two portions of the card reader. When the door is opened, the two portions are no longer optically aligned and, thus, light no longer impinges on the information receiving section. Accordingly, this "open" condition provides a signal to the computer indicating that the door has been opened. If the identity code read into the computer by the card reader does not match a predetermined identity code randomly assigned to the particular premises being monitored, an alert signal is provided.

The light transmitted through the card to be read is preferably modulated so as to minimize the possibility of the system being comprised. In addition, the fiber optics employs a plurality of branches so as to increase the complexity of the code and, one or more of these branches preferably contains polarization means for varying the polarization of either the received or the transmitted light in the reader so as to further prevent compromise of the system. In addition, both space and time diversity may be utilized in such an optical card reader so as to prevent compromise of the system. In addition, a pair of separate input devices, such as a card reader and door position sensor of a more conventional type may be utilized to provide input conditions to the computer indicative of the status of the door to the premises and the authorization of the entrant. If an optical card reader employing both space and time diversity is utilized, an alarm or alert signal may be obtained either due to a disagreement in space diversity which would provide an immediate alarm without the necessity of comparing the authorization code or may be gotten by a comparison of the authorization code if the space diversity is by chance correct or the identity code is incorrect.

DETAILED DESCRIPTION OF THE PREFERRED EMBODIMENTS

Figure 1:
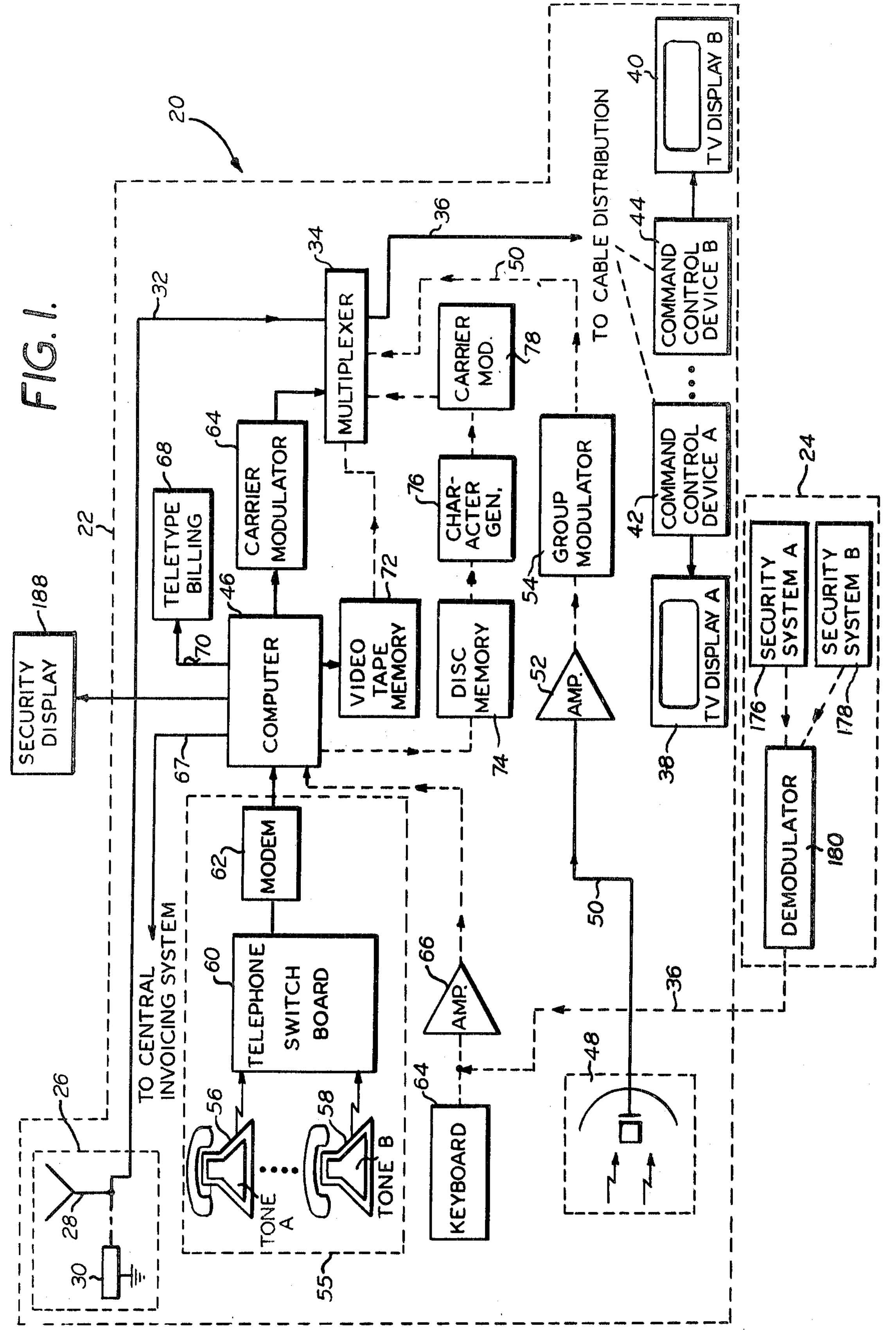
FIG. 1 is a block diagram of the overall system of the present invention.

Referring now to the drawings in detail and especially to FIG. 1 thereof, a block diagram of the overall preferred communication system, generally referred to by the reference numeral 20, of the present invention is shown. The communication system 20 shown in FIG. 1 preferably includes both a secure subscription communication portion, generally referred to by the reference numeral 22, and a premises access monitoring system, generally referred to by the reference numeral 24. As will be explained in greater detail hereinafter, if desired, the communication system 20 of the present invention may preferably include only the secure subscription communication system portion 22, as described in my copending U.S. patent application Ser. No. 235,167, filed Mar. 16, 1972 and entitled "COMMUNICATION SYSTEM," the subject matter of which is hereby specifically incorporated by reference herein in its entirety, or only the premises access monitoring portion 24, or both, depending on the desired utilization of the communication system 20. For purposes of explanation, the communication system 20 shall be described as including both the secure subscription communication portion 22 and the premises access monitoring portion 24, although, it is to be understood that one of these portions, such as the secure subscription communication portion 22, may be omitted without departing from the scope of the present invention.

The secure subscription communication portion 22 of the present invention is preferably a subscription television communication system, although other communication media may be employed in the system 22 of the present invention without departing from the spirit and scope thereof. However, the secure subscription communication system of the present invention shall be described in terms of its preferred communication media which is television. The preferred secure subscription communication system 22 preferably includes a conventional program information signal input 26, such as a conventional television antenna 28 or a conventional cable television input 30. As will be explained in greater detail hereinafter, this conventional input 26 preferably provides normal television programming such as free TV or the presently available cable television service associated with the television distribution system being utilized. This normal program information is fed via a signal path 32 to a conventional multiplexer 34 whose output is connected, via a signal path 36, to the conventional cable distribution system associated with the television of the subscribers receiving this service. By way of example, and not by way of limitation, two such television subscribers 38 and 40, respectively, designated TV display A and TV display B, respectively, are associated with the cable distribution network, although, if desired, any number of subscribers could be connected to the cable distribution network.

Preferably, the subscribers' television display devices 38 and 40 are operatively connected to the cable distribution network via command and control means 42 and 44, respectively, to be described in greater detail hereinafter with reference to FIGS. 2 through 6 and, alternatively, FIGS. 7 and 8. The secure subscription communication system 22 of the present invention also preferably includes a centralized common condition responsive network which is preferably a computer 46 such as a NOVA 1200 computer manufactured by Data General Inc. As will be described in greater detail hereinafter, this computer 46 acts as a supervisory means for supervising program selection of subscription television programs, billing for these programs, and as an integral part of the premises access monitoring system portion 24 for providing alerts of unauthorized entry to minitored premises. The subscription communication information is preferably provided to the secure subscription communication system 22 via conventional means such as laser beam transmission in conjunction with a conventional optical receiver 48 therefor, illustratively shown in FIG. 1, such a laser beam communication system being described by way of example, in greater detail in U.S. Pat. application Ser. No. 142,331, now U.S. Pat. No. 3,757,670, filed May 11, 1971 and entitled "SUBSCRIPTION COMMUNICATION SYSTEM," and assigned to the same assignee as the present invention, the subject matter of which is hereby specifically incorporated by reference herein in its entirety.

If desired, any other conventional manner of providing a subscription communication signal to the system of the present invention may be utilized, such as via microwave transmission or via signals transmitted via high frequency telephone lines. For purposes of illustration, we shall describe the transmitted subscription communication signal as being a laser beam received by optical receiver 48. This received signal preferably includes a plurality of different programs each separated, such as by frequency, from each other. Furthermore, each of these programs is preferably at a frequency which is different from that of the associated frequency of the common display channel on the television receivers 38 and 40 over which the subscription program information is to be displayed. This received signal comprising a plurality of program information signals is preferably provided via signal path 50 through a conventional amplifier 52 to a conventional group modulator 54 which preferably modulates the entire group or band of program information signals so as to convert these received signals as a group from the laser modulated frequencies to compatible television frequencies such that these signals will not be displayed on the television receivers 38 and 40 unless a selected program is converted to the appropriate display channel frequency, as will be described in greater detail hereinafter. The output of the group modulator 54 is provided to the conventional multiplexer 34 where it is multiplexed with the conventional television input provided via signal path 32.

A program selection input condition is provided to the computer 46 via a conventional program selection means. Preferably, the computer 46 is a digital computer and, accordingly, the input signal provided thereto is preferably a digital signal. By way of example, a conventional tone generator 56 and 58, respectively, is associated with each of the television display devices 38 and 40, respectively. As shown and preferred in FIG. 1, these tone generators may be conventional touch-tone telephones 56 and 58 located at the premises where the subscriber's television receiver 38 and 40, respectively, is located. In the example shown, the tone output of the telephones 56 and 58 is conventionally supplied to a conventional telephone switchboard 60 and therefrom through a conventional modem 62 which converts the telephone signals to computer compatible digital signals, to the input of the computer 46 for providing the program selection information signals thereto. If desired, any other program selection means 55 could be utilized in place of the tone generation means, such as a conventional keyboard device 64 or a conventional card reader device. Such an optional keyboard 64 as is shown in FIG. 1 where the output of the keyboard 64 is operatively connected to the computer 46 through a conventional amplifier 66.

As was previously mentioned, and as will be described in greater detail hereinafter, the output of computer 46 is preferably a plurality of command signals which are utilized for selecting the appropriate desired program information signal from the plurality of subscription program information signals provided via path 50. A conventional carrier modulator 64 is connected to the command signal output of computer 46 for modulating the digital signal output of the computer 46 onto a radio frequency (RF) command frequency. The output of this carrier modulator 64 is provided to the multiplexer 34 where it is multiplexed together with the conventional television input provided via path 32 and the subscription television input provided via path 50 to provide a multiplexed communication signal containing a plurality of different program information signals and a plurality of command signals, via path 36, to the cable distribution network and, therefrom, through the associated command control devices 42 and 44, respectively, to their associated conventional television display devices 38 and 40, respectively.

As will be described in greater detail hereinafter, if desired, the computer 46 may also provide an output to a central invoicing system via a path 67 for centralized billing purposes and an output to a conventional teletype 68 via a path 70 for local teletype billing. Furthermore, if desired, as will be described in greater detail hereinafter, the computer 46 may have an associated conventional videotape memory device 72 capable of providing videotape information to the multiplexer 34 which is multiplexed with the other input signals thereto for providing a "special" type of information display on the conventional television display monitors 38 and 40. In addition, computer 46 also has an associated conventional disc memory device 74 whose digital output is supplied via a conventional character generator 76 through a conventional carrier modulator 78 which modulates the video information onto an RF carrier of an unused video channel to supply an information signal to multiplexer 34 where it is multiplexed with the other input signals to provide "special" program information, as will be described in greater detail hereinafter.

COMMAND CONTROL NETWORK

Referring now to FIGS. 2 through 6, a typical preferred command control network, such as command control network 42 or 44 shown in FIG. 1 in block form, will be described in greater detail hereinafter, all such associated networks preferably being identical. Preferably, this typical command and control network 42 will be described in terms of the preferred embodiment wherein the program information signals and the command signals are combined in a frequency multiplexed signal by multiplexer 34 and thereafter transmitted to the cable distribution network via path 36 and, therefrom, to the associated command and control networks or devices 42 and 44. As will be described in greater detail hereinafter, if desired, this signal may be a time division multiplexed signal or have a portion thereof as a time division multiplexed signal wherein the associated command control networks may preferably be as described with reference to FIG. 8.

Figures 2, 7:
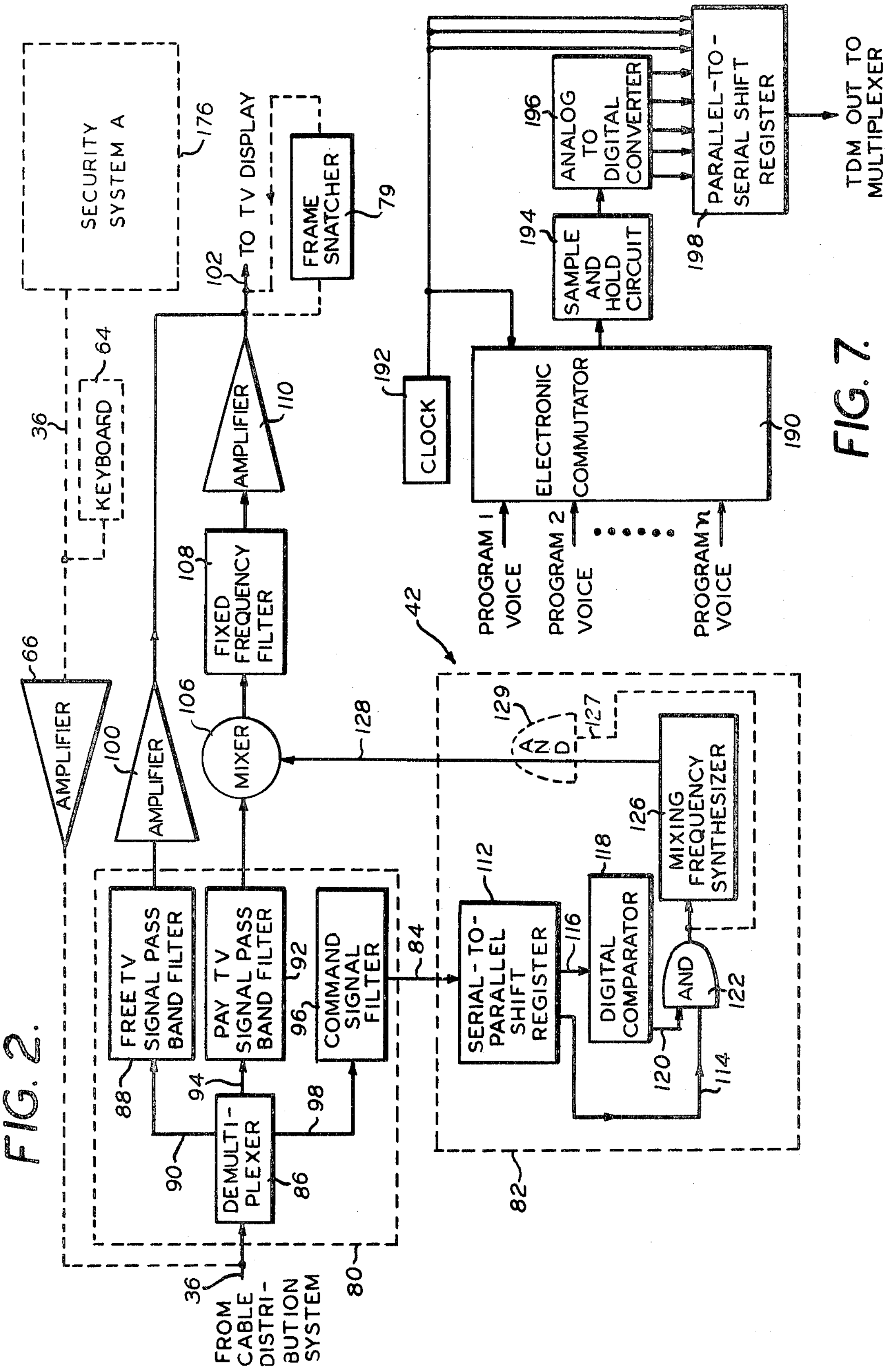
FIG. 2 is a block diagram of a typical command control device associated with the embodiment shown in FIG. 1.
FIG. 7 is a partial block diagram of an alternative embodiment for providing a time division multiplexed signal to the system of FIG. 1.

Referring now to FIG. 2, the command and control network 42 preferably includes a signal separation portion 80 which is operatively connected to the cable distribution system via path 36 and a frequency selection control signal generating portion 82 which is operatively connected to the signal separation portion 80 via signal path 84. The signal separation portion 80 preferably includes a conventional demultiplexer 86 which demultiplexes the frequency multiplexed signal provided from multiplexer 34 and provides this demultiplexed signal to conventional free TV signal pass band filters 88 for the two commercial TV bands via signal path 90, a pay TV signal pass band filter 92 via signal path 94, and a command signal filter and detector 96 via signal path 98. Filters 88, 92 and 96 are preferably conventional pass band filters which respectively pass the frequency band of signals which are the conventional normally used television channels whose frequencies are those conventionally associated with channels 2 through 13 (free TV signals), the band of television signals associated with the subscription or pay TV programs which preferably fall within a band of frequencies outside of those of the normally used conventional television channels (pay TV signals) and the frequency band of signals associated with the command signals which signals are outside the frequency ranges of both the free television signals and the pay television signals. The output of the free TV signal pass band filters 88 are operatively connected to a conventional amplifier 100 whose output is connected to the input of the conventional TV display device, such as device 38 associated with command network 42, via signal path 102. The output of the pay TV signal pass band filter 92 is connected to one input of a two input conventional mixer 106 whose output is operatively connected via display signal path 102 to the input of a conventional fixed frequency filter 108 which is preferably a bandpass filter designed to pass only signals having the frequency of a single common display channel which is preferably utilized for display of subscription television programming. The output of the filter 108 is operatively connected through a conventional amplifier 110 to the input to the conventional television display device 38.

The output of the command signal filter and detector 96 provided via path 84 is preferably connected to the input of a command signal decoder which is preferably a conventional shift register 112. Preferably, as will be described in greater detail hereinafter, the command signal output of filter 96 is a serial bit digital signal and the shift register 112 is a conventional serial-to-parallel shift register for separating this digital signal into a command portion, which is a digital signal provided via path 114, and an identity portion, which is a digital signal provided via path 116. Preferably, each command control network has a unique identification code associated therewith for determining when the particular command and control network is addressed by the computer 46. These unique identity codes are contained in the identifier portion of the command signal provided via path 116 from register 112. This signal is preferably provided via path 116 to the input of a conventional digital comparator 118 which compares the identifier portion of the command signal with the unique identity code address of the control network to generate an enable signal therefrom via path 120 when the identifier portion of the signal matches the unique identity code associated with the particular command control network. The command portion of the signal provided via path 114 from register 112 is preferably provided to the input of a conventional AND gate 122 whose enable signal input provided via path 120 results from the provision of the proper unique identity code signal via path 116 to digital comparator 118. The output of the AND gate 122 is the command signal information portion which is preferably provided via path 124 to the input of a digital mixing frequency synthesizer network 126 shown in greater detail in FIGS. 3 through 6 and to be described in greater detail hereinafter with reference thereto. The output of the digital mixing frequency synthesizer 126 is a frequency selection control signal which is preferably provided via signal path 128 to the other input of mixer 106 and is a signal having a frequency such that when this signal is mixed with the plurality of subscription program information signals provided to mixer 106 at frequencies other than the common display channel frequency, results in the provision of the selected subscription program information signal at the frequency of the common display channel, the other signals being filtered out by fixed frequency filter 108 thereafter. As will be described in greater detail hereinafter, the timing control for the provision of the frequency selection control signal is preferably directly controlled by the computer 46 by controlling the time at which and during which the computer 46 provides the command signal. However, if desired, alternatively the computer 46 may provide a separate timing signal portion as part of the command signal which timing signal portion may be provided via path 127 and utilized to enable an AND gate 129 whose information input is the output of synthesizer 126.

FREQUENCY SELECTION CONTROL SIGNAL GENERATION

Figures 3, 4A, 4B, 5, 6:
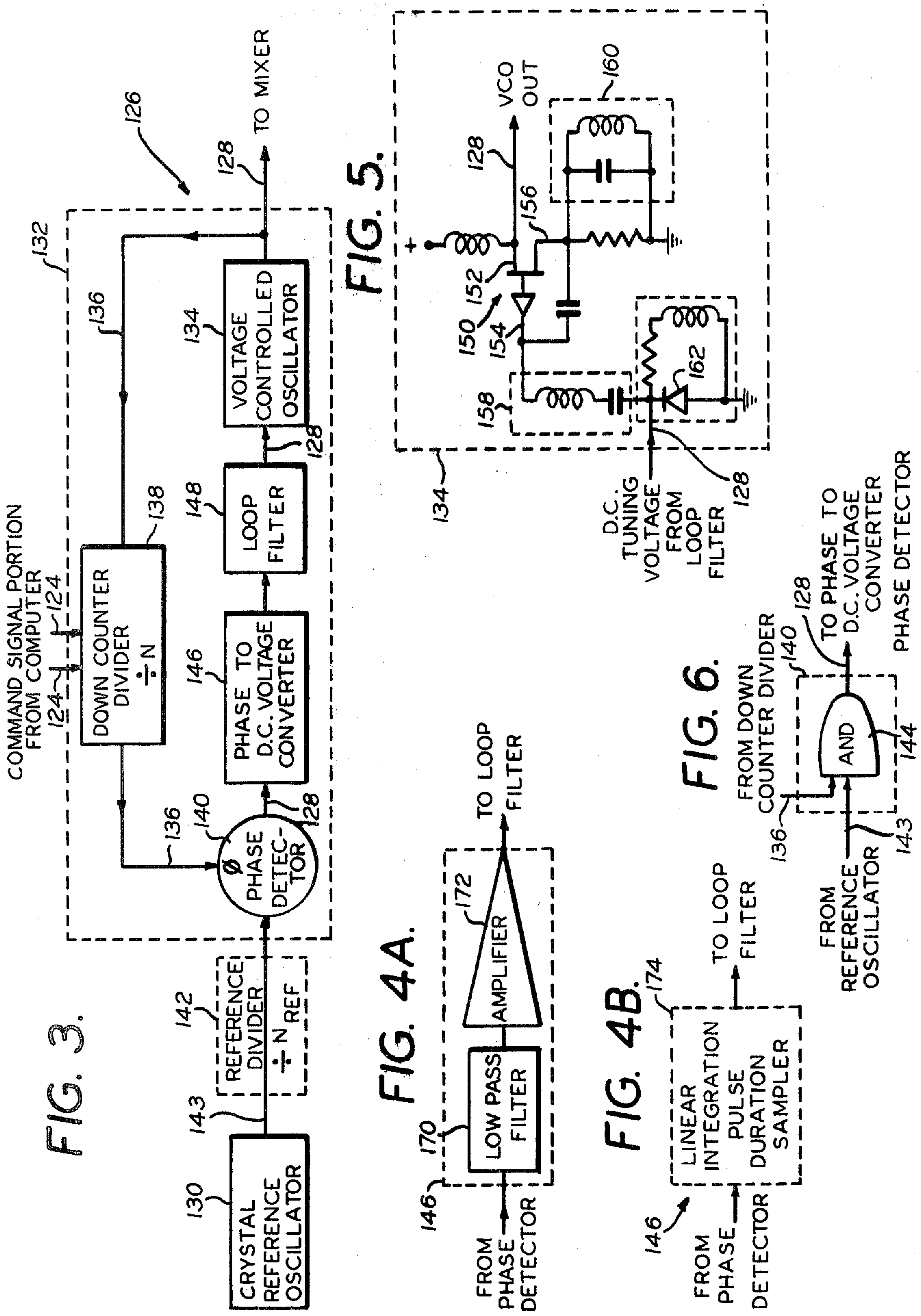
FIG. 3 is a block diagram of a typical mixing frequency synthesizer portion of the embodiment shown in FIG. 2.
FIGS. 4A and 4B are block diagrams of typical alternative embodiments of a phase-to-DC voltage converter portion of the embodiment shown in FIG. 3.
FIG. 5 is a schematic diagram of a typical voltage controlled oscillator portion of the embodiment shown in FIG. 3.
FIG. 6 is a logic diagram of a typical phase detector portion of the embodiment shown in FIG. 3.

Referring now to FIG. 3, a typical preferred digital frequency synthesizer 126 is shown. As shown and preferred, the digital frequency synthesizer 126 preferably includes a reference oscillator 130 whose output is provided to a conventional phase locked loop network 132 for providing a mixing frequency signal to mixer 106 via path 128. The choice of reference oscillator 130, which constitutes the precision frequency standard of the system, is preferably dictated by the frequency accuracy and spectrum desired, the number of channels required, the allowable acquisition time, and the spurious suppression specifications. Most preferably, the reference oscillator 130 is a highly stable oscillator, such as a quartz crystal oscillator or, if desired, a tuning fork oscillator. The phase lock looped portion 130 of the synthesizer 126 preferably includes a conventional voltage controlled oscillator 134, such as a conventional Clapp oscillator shown in FIG. 5, by way of example, which is tuned over the desired mixing frequency range by means of the phase locked loop. The frequency selected for the output of the voltage controlled oscillator 134 is held fixed, in the example shown, with crystal accuracy through the feedback system in the servo loop which, as shown and preferred, is a digitally variable feedback system, via feedback path 136.

The command information portion of the command signal provided via path 124 to the synthesizer 126 is preferably a parallel bit digital signal and is preferably operatively connected to the input of a conventional digital frequency divider 138 having a variable division ratio represented by "÷ N", the division ratio being varied in accordance with the command information provided via path 124. Preferably, the digital frequency divider 138 is a conventional down counter such as one comprising a plurality of flip-flops. The feed-back frequency output of divider 138 provided via feedback path 136 is provided as one input to a two input conventional phase detector network 140 whose other input is the output of the reference oscillator 130. Preferably, the output of the reference oscillator 130 corresponds to the required phase detector frequency, which is the frequency spacing between adjacent program information signals comprising the subscription communication signal band.

If desired, another conventional difference frequency divider network, having a fixed division ratio, may be utilized between the reference oscillator 130 and the phase detector 140 if the frequency of the reference oscillator 130 is not at the value of the desired phase detector frequency. The phase detector 140, as shown and preferred in FIG. 6, is preferably a digital phase detector, such as a conventional AND gate 144 whose output is proportional to the phase difference between the reference oscillator signal (in digital form) and the feedback frequency divider from divier 138. The output from divider 138. The output of the conventional phase detector 140 is operatively connected via path 128 to the input of a conventional phase-to-DC voltage converter 146 which converts this phase difference output signal to a DC voltage which is utilized to control the frequency of the voltage controlled oscillator 134, which preferably has a variable frequency output. The output of the phase-to-DC voltage converter 146 is preferably connected through a conventional loop filter network 148, which, as will be described in greater detail hereinafter, preferably provides the proper pull-in and hold-in phase loop characteristics together with the gain control of the converter 46, to the oscillator 134. This DC voltage output is utilized to tune the voltage controlled oscillator 134.

By way of example, referring to FIG. 5, a Clapp type voltage controlled oscillator 134 preferably includes a conventional field effect transistor 150 having a source electrode 152, a gate electrode 154 and a drain electrode 156. A conventional series resonant tuning circuit 158 is operatively connected to the gate electrode 154 and a conventional parallel resonant tuning circuit 160 is operatively connected to the drain electrode 156. A conventional varactor 162 is operatively connected to tuning circuit 158 and the DC voltage input provided via path 128 electronically varies the capacitance of varactor 162 which, thus, changes the capacitance of tuning circuit 158 thus retuning oscillator 134 so as to change the frequency of oscillation. If desired, the voltage controlled oscillator 134 could be any other type of conventional voltage controlled oscillator such as a Wien bridge oscillator or a relaxation oscillator, such as one employing a Shockley diode.

With respect to the phase-to-DC voltage converter 146, any conventional means for conversion of the phase signal to a DC voltage may be utilized; however, such converter 146 should preferably be of the type which provides a substantially stable DC voltage as a result of this conversion. One such conventional converter 146 is shown in FIG. 4A in which a conventional low pass filter network 170 is operatively connected to an amplifier 172, the low pass filter passing only the DC component of the input signal and attenuating the high frequency components, the low pass filter network 170 preferably containing sufficient sections of low pass filtering and rejection filtering at each of the undesired frequencies in the digital input signal, such as the phase detector frequency and the harmonics thereof, so as to minimize variations in this resultant DC voltage as variations therein can lead to undesirable frequency modulation of the voltage controlled oscillator 134.

As shown and preferred in FIG. 4B, the phase-to-DC voltage converter 146 is preferably a linear integration pulse duration sampler network 174 which provides a DC signal without AC components. The operation of this network 174 will be described in greater detail hereinafter.

PREMISES ACCESS MONITORING SYSTEM

Referring once again to FIGS. 1 and 2, the premises access monitoring system 24 is shown in block form. As shown and preferred, a security system input device 176 and 178 is respectively associated with each of the plurality of television display devices 38 and 40 in the example shown, and is preferably located in each of the respective premises where the television display devices 38 and 40 are located. The respective outputs of the security systems 176 and 178 are fed to a conventional demodulator 180 which demodulates the RF signal to a digital carrier and, therefrom, through the conventional cable distribution network associated with the television display devices 38 and 40 and through the two-way communication signal path 36 to the input of the computer 46 where this input information is processed in a manner to be described in greater detail hereinafter to provide premises access monitoring.

As shown and preferred, each security system input device 176 and 178 is associated with a corresponding command control device 42 and 44, respectively, the associated command and control device 42, 44 preferably providing the unique identifier code address of the associated monitored premises to the security device 176, 178, respectively, via signal paths 177 and 179, respectively, and a command signal or "reply" command via signal paths 181 and 183, respectively, to initiate transmission of the security information to the computer, the reply signal 181–183 indicating that the associated comparator 118 has made the proper comparison of the transmitted identity code of the interrogation signal. The associated identifier code is preferably transmitted to the computer 46 as part of the security message output of security device 176 or 178 to ensure data transmission accuracy. The associated reply or command signal preferably provides a synchronous transmission media between the computer 46 and each of the security devices 176, 178, this synchronous transmission preferably being achieved by a time division multiplexed technique in which the computer 46 consecutively and repeatedly preferably rapidly interrogates or polls each location or premises for data. In this manner when an associated command control device 42, 44 receives an interrogation, it preferably sends a reply or command signal via path 181 or 183, respectively, to its associated security device 176 or 178, respectively, to transmit its data, such as the code of a card which has been read, to the computer 46, such code being preferably temporarily stored, for example, in a shift register (not shown) until such interrogation. As shown and preferred in FIGS. 2, the unique identifier code via path 177 or 179 is preferably provided from the portion of the associated comparator 118 which contains this signal and the reply or command signal 181 or 183 is preferably also provided from the comparator 118 in the manner of the enable signal provided via path 120.

Figure 9:
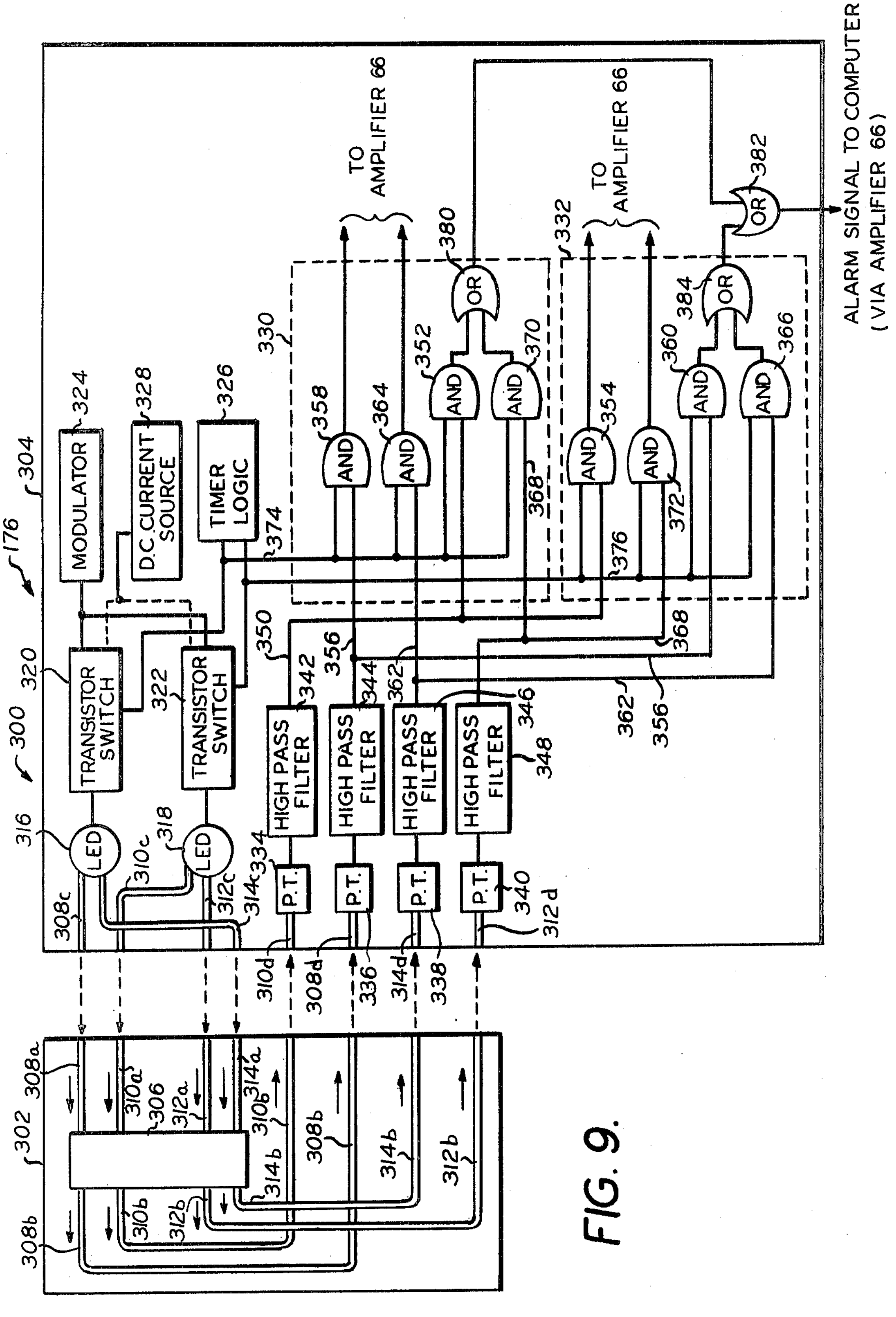
FIG. 9 is a block diagram of a typical preferred security system device associated with the embodiment shown in FIGS. 1 and 2.

Referring now to FIG. 9, as shown and preferred therein, each typical security system 176 or 178, security system 176 being shown by way of example in FIG. 9, all of the associated security systems preferably being identical, preferably comprises an optical card reader, generally referred to by the reference numeral 300, which preferably includes a card receiving portion 302 for preferably receiving a randomly coded card having a randomly assigned digital code imprinted thereon preferably comprising either an aperture or no aperture at each of the bit positions of the card, and a light-transmission-and information-transmitting-and-receiving portion 304 spaced therefrom and optically aligned therewith as will be described in greater detail hereinafter. Preferably, the card receiving portion 302 is located in the door to the premises being monitored while portion 304 is preferably located in either the door jamb or the wall of the premises being monitored adjacent to portion 302.

As will be described in greater detail hereinafter, portion 304 preferably contains both means for transmitting light to portion 302 and for receiving light information from portion 302 which has resulted from a card being inserted in portion 302. This light information received by portion 304 is formatted and input to the computer 46 over the communication signal path. In addition, since portions 302 and 304 are in optical alignment, this is an indication to the computer 46 that the door is closed. When the door containing portion 302 is opened light information is no longer received by portion 304 and this condition is transmitted to the computer 46 as an indication that the door to the premises being monitored has been opened. Thus, card reader 300 provides input conditions to the computer 46 indicating both the identity of the entrant to the premises and an indication that the premises have been entered.

The associated control network, network 42 in the example being described, provides the unique identity code associated with the particular premises to the computer 46 as another input condition thereto. As will be described in greater detail hereinafter, in one instance the computer 46 compares the identity code of the entrant with the authorized identity code assigned to these premises and stored in the computer 46 memory. If the identity codes do not match then the computer 46 provides an alert signal such as an audio-visual signal to a conventional security display device 188 which preferably sounds both an aural alarm and displays the room number of the premises which have been entered without proper authorization. In the embodiment shown in FIG. 9, which, as will be described in greater detail hereinafter, provides both space and time diversity for the information, if space diversity exists, an immediate alarm signal is provided to the computer 46 without the necessity of comparing the identity code of the entrant with the authorized identity code assigned to these premises as both space and time diversity must be present for an indication of proper authorization.

Thus, in the embodiment shown in FIG. 9, an alarm condition may be provided either immediately if proper space diversity does not exist, or after a comparison of the identity code of the entrant with the authorized identity code. The operation of this premises access monitoring system 24 will be described in greater detail hereinafter.

The card receiving portion 302 preferably includes a card receiving slot 306 in which the card to be read may be inserted and a fiber optic network of conventional light pipes 308*a*–308*b*, 310*a*–310*b*, 312*a*–312*b* and 314*a*–314*b*. As is well known, conventional light pipes, such as transparent plastic rods, transmit light from one end to the other even when bent as in the configurations illustrated in FIG. 9. The path of the light being directed through the light pipes 308*a*–308*b*, 310*a*–310*b*, 312*a*–312*b* and 314*a*–314*b* as shown by the arrows in FIG. 9. For purposes of clarity, light pipes 312*b* and 314*b* are shown passing in front of light pipes 308*b* and 310*b*, these pipes not intersecting but rather pipes 308*b* and 310*b* being continuous as are pipes 312*b* and 314*b*. By way of example, light pipes 308*a*, 310*a*, 312*a*, and 314*a* are located at designated bit reading positions for a card to be inserted in slot 306, four such positions being shown merely by way of example. If desired, any number of positions depending on the complexity of the code, may be utilized.

Light pipe sections 308*b*, 310*b*, 312*b* and 314*b*, respectively, have the entrance ends thereof preferably, respectively, optically aligned with the exit ends of light pipes 308*a*, 310*a*, 312*a*, and 314*a*, respectively, the entrance and exit ends being determined by the direction of light passing therethrough as indicated by the arrows in FIG. 9.

The light-transmission-and-information-receiving-and-transmitting portion 304 preferably includes the light energy source which preferably comprises a pair of conventional light emitting diodes 316 and 318. Light emitting diode 316 preferably has the light output thereof directed through a pair of light pipes 308*c* and 314*c* which are preferably optically aligned with light pipes 308*a* and 314*a*, respectively. The light output of light emitting diode 318 is preferably directed through light pipes 310*c* and 312*c* which are preferably optically aligned with light pipes 310*a* and 312*a*, respectively. This optical alignment is preferably indicated by the dashed line arrows in FIG. 9. For purposes of clarity, light pipe 314*c* has been shown as passing in front of light pipes 310*c* and 312*c* and does not intersect either of these pipes, all of these pipes being continuous. Light emitting diode 316 preferably has the input thereto electrically connected to the output of a conventional transistor switch 320. Similarly, the input to light emitting diode 318 is preferably connected to the output of another conventional transistor switch 322. A conventional modulator 324 such as a one megacycle oscillator is operatively electrically connected in parallel to light emitting diode 316 and 318 through transistor switches 320 and 322, respectively, for pulse amplitude modulating the light outputs of light emitting diodes 316 and 318. The operation of transistor switches 320 and 322 is preferably controlled by means of a conventional timing logic circuit 326 which is electrically connected in parallel to transistor switches 320 and 322 for alternatively biasing these switches 320 and 322 into the on or off condition, respectively, light emitting diodes 316 and 318 only transmitting when their associated switch is biased in the on condition to connect the respective light emitting diode to the output of modulator 324.

If desired, a conventional DC current source 328 may be electrically connected in parallel to transistor switches 320 and 322 in lieu of modulator 324 for providing straight pulse modulation for the output of the light emitting diodes 316 and 318 instead of pulse amplitude modulation therefor. In such an instance the conventional timing logic 326 once again controls the operation of transistor switches 320 and 322.

Portion 304 also preferably includes conventional logic networks 330 and 332 which format the information received after the card has been read and transmits this information to the computer 46.

Portion 304 also preferably includes conventional photo transistors 334, 336, 338 and 340 for receiving light information transmitted by light pipes 310*b*, 308*b*, 314*b* and 312b, respectively. The inputs to the photo transistors 334 through 340, inclusive, are respectively optically coupled to conventional light pipes 310*d*, 308*d*, 314*d* and 312*d* whose entrance ends are preferably optically aligned with the exit ends of light pipes 310*b*, 308*b*, 314*b* and 312*b*, respectively, as shown in FIG. 9 by the dash line arrows. As shown and preferred in FIG. 9, by the arrangement of the light pipes 308*c*, 310*c*, 312*c* and 314*c* at the light transmitting end and the arrangement of the light pipes 310*d*, 308*d*, 314*d* and 312*d* as dictated by the arrangement of the light pipes in portion 302, space diversity is provided. Similarly, by means of timing logic 326 in conjunction with switches 320 and 322 and modulator 324, time diversity is provided. Thus, both space and time diversity are provided by the embodiment shown in FIG. 9.

The outputs of photo transistors 334 through 340, inclusive, are electrical signals which, when modulator 324 is utilized, are each, respectively, passed through conventional high pass filters 342, 344, 346 and 348, respectively, in order to pass the RF carrier and discriminate against DC, such high pass filters only being required when pulse amplitude modulation is utilized. If straight pulse modulation is utilized, that is if the DC current source 328 is utilized in lieu of modulator 324, then high pass filters 342 through 348, inclusive, may be omitted. The output of high pass filter 342 which is indicative of the signal provided via light pipe 310*c*, 310*a* through the card to 310b and therefrom to 310*d*, is directed via path 350, in parallel, to the input of conventional two input AND gates 352 and 354, respectively. Similarly, the output of high pass filter 344 which is determined from light path 308*c*, 308*a* through the card to 308*b* and therefrom to 308*d*, is directed via parallel path 350 to one input of conventional two input AND gates 358 and 360. Similarly, the output of high pass filter 346 which is a result of the light directed via light path 314*c*, 314*a*, through the card, to 314*b* and therefrom to 314*d*, is directed via parallel path 362 to one input of conventional two input AND gates 364 and 366. Finally, similarly, the output of filter 348 which is a result of the light directed along path 312*c*, 312*a*, through the card, to 312*b* and therefrom to 312*d*, is directed via parallel path 368 to one input of conventional two input AND gates 370 and 372. The output path of the timing logic circuit 326 which controls the operation of transistor switch 320 is connected in parallel to the other input of AND gates 358, 364, 352 and 370 via path 374 while the output of timing logic 326 which controls the operation of transistor switch 322 is connected in parallel to the other input of AND gates 354, 372, 360 and 366 via path 376.

The outputs of AND gates 358, 364, 354 and 372 are provided to demodulator 180 and therefrom to amplifier 66 and computer 46 where this information is compared against the identity code stored in the computer 46 memory. If the code provided along this path does not match this identity code an alarm signal is given as discussed previously. Thus, the outputs of AND gates 358, 364, 354 and 372 require proper time diversity. The outputs of AND gates 352 and 370 are connected to a conventional OR gate 380 whose output is in turn connected to the input of another conventional OR gate 382. Similarly, the outputs of AND gates 360 and 366 are connected to the inputs of a conventional OR gate 384 whose output is in turn connected to the input of OR gate 382. These gates 352, 370, 360 and 366 determine space diversity. Thus, if the space diversity is not correct, a particular arrangement being shown by way of example in FIG. 9, but not by way of limitation, and a signal is provided to OR gate 382 this will provide an immediate alarm indication to computer 46 via demodulator 180 and amplifier 66 without the necessity of comparison of the identity code read from the card with the identity code stored in the computer 46 memory as both space diversity and time diversity must be correct for a proper authorization. The computer 46 will in turn provide the alert described above. As was previously mentioned, the outputs of AND gates 358, 364, 354 and 372, as well as the output of OR gate 382 are preferably temporarily stored (not shown) until the particular security device 176 or 178 is interrogated rather than being transmitted when read, although this may be done if desired.

ALTERNATIVE EMBODIMENTS - SECURITY SYSTEM

Figure 10:
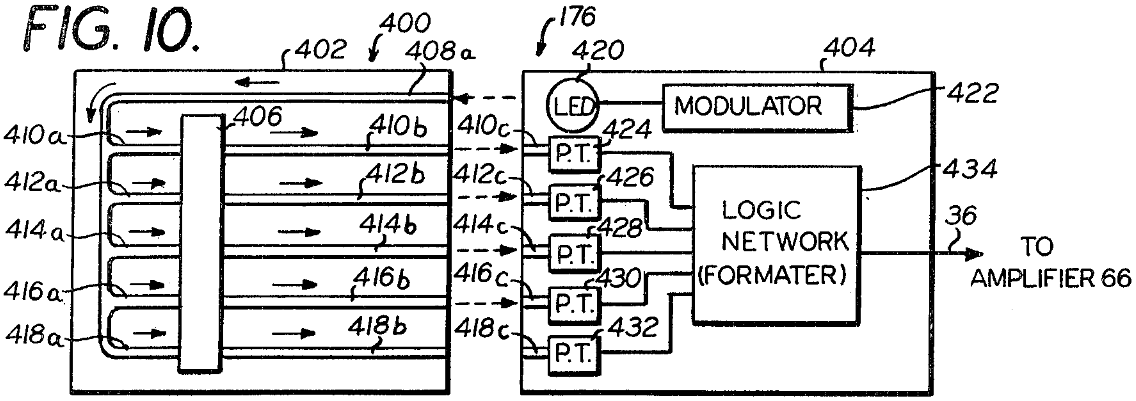
FIG. 10 is a block diagram of an alternative embodiment of the security system device shown in FIG. 9.

Referring now to FIG. 10, an alternative embodiment of the typical security system 176 is shown. As in the preferred embodiment, the security system 176 shown in FIG. 10 preferably includes a card receiving portion 402 and a lighttransmission-and-information-receiving-and-transmitting portion 404. As was previously mentioned with respect to the embodiment shown in FIG. 9, portion 402 is preferably located in the door to the premises and portion 404 is preferably located in the door jamb or the wall adjacent portion 402 and in optical alignment therewith. Portion 402 preferably includes a slot 406 for insertion of a card to be read therein and a fiber optic array of light pipes comprising a main light pipe 408*a* and a plurality of light pipe branches 410*a*, 412*a*, 414*a*, 416*a* and 418*a*, the direction of light through light pipe 408*a* and its respective branches 410*a* through 418*a*, respectively, being indicated by the arrows in FIG. 10.

As shown and preferred, optically aligned with the exit ends of light pipe branches 410*a* through 418*a*, respectively, are light pipes 410*b*, 412*b*, 414*b*, 416*b* and 418*b*, the entrance ends thereof being optically aligned with the exit ends of light pipes 410*a* through 418*a*, respectively, the direction of light therethrough being indicated by the arrows in FIG. 10. Light pipe pairs 410*a*–410*b*, 412*a*–412*b*, 414*a*–414*b*, 416*a*–416*b* and 418*a*–418*b* are preferably located at the bit reading positions of the card to be inserted, five such positions being shown by way of example although any number of positions may be utilized depending on the desired complexity of the code.

Now describing the light-transmission-and-information-receiving-and-transmitting portion 404 of card reader 400 shown in FIG. 10. As was previously described with reference to the embodiment shown in FIG. 9, the light-transmission-and-information-receiving-and-transmitting portion 404 of the card reader 400 preferably includes a source of illumination which is preferably a conventional light emitting diode 420 optically aligned with light pipe 408*a* as indicated by the dotted arrow in FIG. 10. As shown and preferred, light emitting diode 420 is preferably driven by a conventional modulator 422, such as a one megacycle oscillator, to modulate the light source so as to enhance the security of the reader 400 and minimize the possibility of compromise. Portion 404 also preferably includes a plurality of light detectors, such as conventional photo transistors 424, 426, 428, 430 and 432 which are, respectively, optically aligned with light pipes 410*b*, 412*b*, 414*b*, 416*b*, and 418*b*, respectively, as indicated by the dotted arrows in FIG. 10 for reception of light signals provided from the ends of these light pipes. As shown and preferred in FIG. 10, light pipes 410c, 412c, 414c, 416c and 418c are respectively optically aligned with light pipes 410b, 412b, 414b, 416b and 418b for providing the channelized light therefrom to the photo transistors 424, 426, 428, 430 and 432, respectively. The output of photo transistors 424 through 432 inclusive, which is an electriclal signal provided in a conventional photo electric manner in response to the condition of photo transistors 424 through 432, inclusive, with respect to illumination impinging thereon, is connected to the input of a conventional logic network formatter 434 for formatting the signals provided from the photo transistors 424 through 432, inclusive, into a conventional digital signal for transmission to the computer via path 36 (via temporary storage if desired). The computer 46 compares the identity code of the entrant, which is the information provided in the signal being output from the logic network 434, with the authorized identity code assigned to these premises and stored in the computer 46 memory.

As was previously mentioned with respect to the embodiment shown in FIG. 9, when the door is opened, portions 402 and 404 are no longer optically aligned and a signal is accordingly transmitted to computer 46 via path 36 which is indicative of the open condition. Thus, the comparator receives the identity code of the entrant and the status of the door as input conditions from card reader 400. If the identity codes do not match then the computer 46 provides an alert signal such as an audio-visual signal to the conventional security display device 188 which preferably sounds both an aural alarm and displays the room number of the premises which have been entered without proper authorization.

Figure 11:
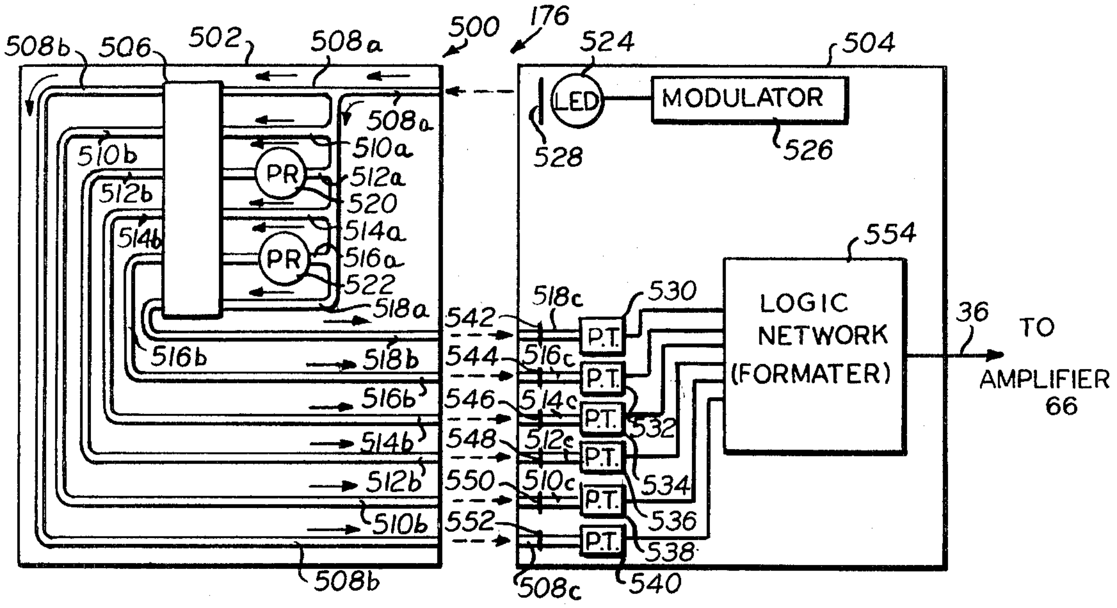
FIG. 11 is a block diagram of another alternative embodiment of the security system device shown in FIG. 9.

Referring now FIG. 11, still another alternative embodiment of the security system 176 of the present invention is shown. As was previously described with reference to the embodiment shown in FIGS. 9 and 10, the security system 176 preferably comprises a card reader 500 having a card reading portion 502 and g light-transmission-and-info7mation-receiving-and-transmitting portion 504 spaced therefrom and optically aligned therewith. As was also previously mentioned, portion 502 is preferably located in the door to the premises and portion 504 is preferably located in an adjacent door jamb or portion of the wall. Card receiving portion 502 preferably includes a card receiving slot 506 in which the encoded card to be read is inserted by the prospective entrant to the premises. The card receiving slot 506 preferably includes a plurality of bit reading positions, six such position being shown in the example shown in FIGB 11, although any other desired number of positions may be utilized depending on the desired complexity of the code. For example, a six bit binary code as illustrated in FIG. 11 provides 65 possible arrangements. Card reader 500 is p7eferably an optical card reader including fiber optics. Portion 502 probably includes a main light pipe 508a for receiving light transmitted thereto from portion 504 and a plurality of branches, five such branches 510a, 512a, 514a, 516a and 518a being shown in addition to main light pipe 508a being shown by way of example in the six bit card reader illustrated in FIG. 11. Preferably, at least one of these light pipe branches preferably includes a conventional polarization rotator or polarizer, two such polarizers 520 and 522 being shown by way of example in FIG. 11 as being contained in the paths of light pipes 512a and 516a, respectively. These polarizers 520 and 522 change the polarization of the light received in light pipe branches 512a and 516a, respectively, so as to enhance the security of the system such as avoiding a compromise of the system by the use of a reflective surface between portions 502 and 504.

An equal plurality of light pipes 408b, 510b, 512b, 514b, 516b and 518b are, respectively, optically aligned with light pipe branches 508a, 510a, 512a, 514a, 516a and 518a, respectively, on the opposite side of the card receiving slot 506 so as to pick up any light transmitted to a bit reading position in the card in any of these respective six positions. The direction of light transmission is indicated by the arrows in FIG. 11.

Now describing the light-transmission-and-information-receiving-and-transmitting portion 504 of card reader 500 shown in FIG. 11. As was previously mentioned with respect to the embodiment shown in FIGS. 9 and 10, portion 504 preferably includes a source of illumination such as a conventional light emitting diode 524. As shown and preferred, light emitting diode 524 is driven by a conventional modulator 526 such as one megacycle oscillator for modulating the light output of light emitting diode 524. In addition, as shown and preferred, a conventional polarizer 528 is preferably provided in front of light emitting diode 524 so as to provide a predetermined polarization to the light output of diode 524 in order to enhance the security of the system so as to prevent arbitrary light from being utilized to compromise the system and to provide a base line orientation for the polarization of the system 500. The polarized output of light emitting diode 524 is optically aligned with main light pipe 508a of portion 502 as indicated by the dotted arrow in FIG. 11. Portion 504 also preferably includes a plurality of photo detectors, such as conventional photo transistors 530, 532, 534, 536, 538 and 540 optically aligned with the exit ends of light pipes 518b, 516b, 514b, 512b, 510b and 508b, respectively, via light pipes 518c, 516c, 514c, 512c, 510c and 508c, respectively. As shown and preferred, each of the light pipes 518c, 516c, 514c, 512c, 510c and 508c each includes a conventional polarization filter interposed in the path thereof between the entrance end thereof and the respective photo transistors 530, 532, 534, 536, 538 and 540, respectively. These filters are conventional polarization filters 542, 544, 546, 548, 550 and 552 which sense the polarization of the light being received by light pipes 518c, 516c, 514c, 512c, 510c and 508c, respectively, from light pipe 518b, 516b, 514b, 512b, 510b and 508b, respectively. Polarization filters 542 through 552, inclusive, respectively only pass properly polarized light and will block light which does not have the predetermined polarization of the respective filter. Thus, only light which has the proper polarization for the designated bit reading position or light pipe will impinge on the respective photo transistor 530 through 540, inclusive. The output of these photo transistors which are electrical signals are connected to a conventional logic network formater 554 which converts these signals into a digitally compatible signal in a conventional manner which is transmitted therefrom to the computer 46 via communication path 36 (via temporary storage if desired).

As was previously described with respect to the embodiment shown in FIGS. 9 and 10, when the door to the premises is opened portions 502 and 504 are no longer optically aligned so that a signal is no longer transmitted to the photo transistors 530 through 540, inclusive, and therefrom to the logic 554. This condition is transmitted to the computer 46 and, in this manner, the security system provides an indication of the status of the door to the premises as well as providing the identity code of the entrant to the premises when the card is read with portions 502 and 504 optically aligned. As was previously mentioned, the computer 46 compares the identity code of the entrant with the authorized identity code assigned to these premises and stored in the computer 46 memory. If the identity codes do not match then the computer 46 provides an alert signal of the type previously mentioned to security display device 188 which preferably sounds both an aural alarm and displays the room number of the premises which have been entered without proper authorization. The operation of the embodiment shown in FIGS. 9, 10 and 11 will be described in greater detail hereinafter. Suffice it to say at this point that, as in the embodiment described with reference to FIG. 9, the associated control network 42 in the alternative embodiments described with reference to FIGS. 10 and 11 provides the unique identity code associated with the particular premises to the computer 46 (via path 177 or 179) as another input condition thereto so that the computer 46 may correlate the information being received with respect to the identity code of the entrant and the status of the door with the address of the premises being monitored.

Figure 12:
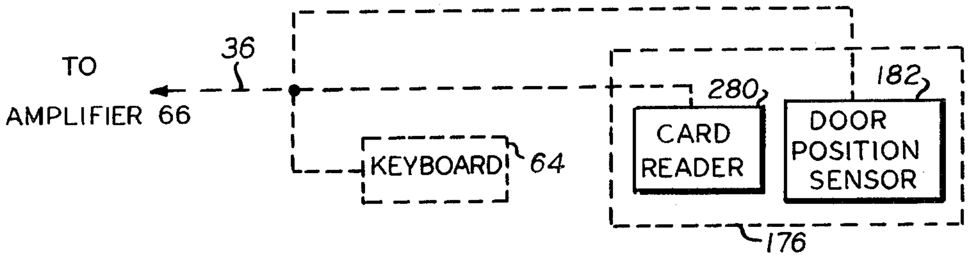
FIG. 12 is a block diagram of a portion of the overall system shown in FIGS. 1 and 2 showing a block diagram of still another alternative embodiment of the security system device shown in FIG. 9.

Now referring to FIG. 12, still another alternative embodiment of the security system 176 of the present invention is shown. The embodiment shown in FIG. 12, is preferably identical with that previously described in my copending U.S. Pat. application Ser. No. 235,167 of which this application is a continuation-in-part.

The typical security system 176 shown in FIG. 12 preferably includes a conventional identity input device, such as a conventional card reader 280 for reading a randomly coded card having a randomly assigned digital code imprinted thereon which information is input to the computer 46 through demodulator 180 over the communication signal path, and a conventional access status monitoring means such as a conventional door position sensor 182, such as a conventional microswitch operated by position sensor attached to the door to the premises being monitored, the door position sensor 182 monitoring the condition of the door and transmitting a signal through demodulator 180 via the communication signal path to the computer 46 each time the associated door is opened (as opposed to both door status and identity code being transmitted by a single device as in the previously described embodiment shown in FIGS. 9, 10 and 11). Thus, both the card reader 280 which reads the identification card inserted therein and the door position sensor 182 which monitors the status of the door to the premises, provide input conditions to the computer 46 indicating both the identity of the entrant to the premises and an indication that the premises have been entered. The associated control network, network 42 in the example being described, provides the unique identity code associated with the particular premises to the computer 46 as another input condition thereto. As in the above previously described embodiments, the computer 46 compares the identity code of the entrant with the authorized identity code assigned to these premises and stored in the computer 46 memory. If the identity codes do not match then the computer 46 provides an alert signal such as an audio-visual signal to the conventional security display device 188 which preferably sounds both an aural alarm and displays the room number of the premises which have been entered without proper authorization. As was previously mentioned, the security information may preferably be temporarily stored (not shown) until the particular premises is interrogated. The operation of the premises access monitoring system 24 will be described in greater detail hereinafter.

ALTERNATIVE EMBODIMENT - COMMAND CONTROL NETWORK

Figure 8:
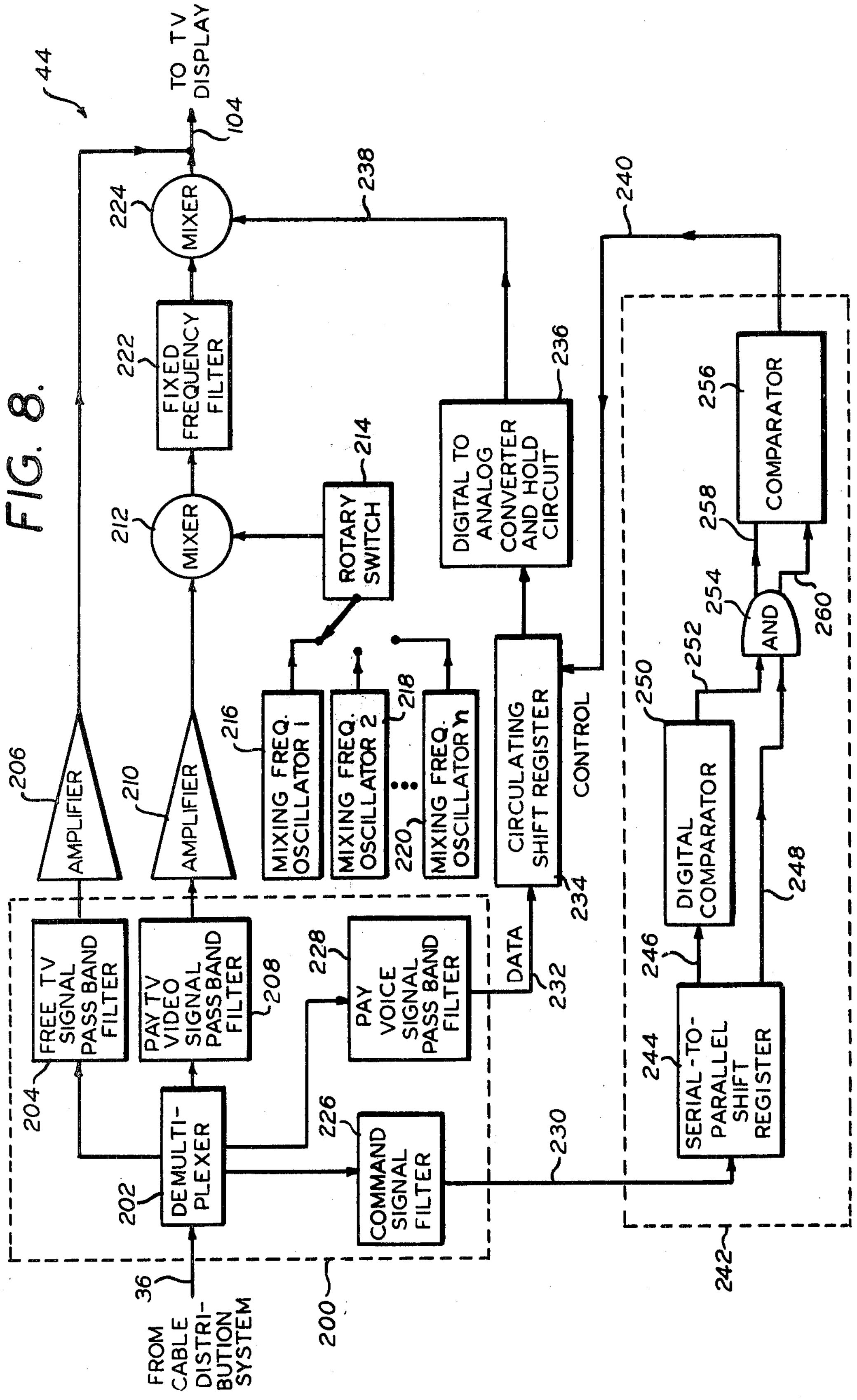
FIG. 8 is a block diagram of an alternative embodiment of a typical command control device for use with the system of FIG. 1.

Referring now to FIGS. 7 and 8, an alternative embodiment of the typical command control network 42 of the present invention is shown. By way of example, we shall assume that the subscription television program information is transmitted segregated into a band of video signal portions and a band of audio signal portions, each audio signal portion corresponding to a single particular video signal portion so as to constitute a composite program information television signal when the corresponding video and audio portions are combined. FIG. 7 depicts, by way of example, a typical preferred manner of creating a time division multiplexed signal consisting of the audio portions of the program information television signals. As shown and preferred in FIG. 7, the associated audio portions labeled "Program 1 voice" through "Program *n* voice" are provided to a conventional electonic commutator 190 such as the type manufactured by Texas Instruments and designated application Ser. No. 74,150. A conventional clock 192 signal is provided to the electronic commutator 190 or electronic switch so as to synchronize the operation thereof. The output of the electronic commutator 190 is a time division multiplexed signal with each of the program information audio portions being contained in a particular associated time segment synchronized with clock 192. The output of electronic commutator 190 is operatively connected to a conventional sample and hold circuit whose output is, in turn, connected to a conventional analog-to-digital converter 196 for converting the analog time division multiplexed signal to a parallel bit digital signal. The clock signal output of clock 192 is also preferably a parallel bit binary code. The parallel bit output of the analog-to-digital converter 196 is preferably operatively connected, together with the parallel bit output of clock 192, to the input to a conventional parallel-to-serial shift register 198 whose output is a serial bit digital time division multiplexed signal which is provided to multiplexer 34 via signal path 50. Preferably, six bits of time provides 64 possible channels and ten bits of voice or audio give a 1000:1 dynamic range per channel.

Referring now to FIG. 8, a typical command control network for providing subscription communication program selection wherein a time division multiplexed signal and a frequency multiplexed signal contain the subscription communication information is shown. For purposes of illustration, it will be assumed that the program information signals are composite signals having both a video portion and an audio portion, as was previously mentioned with reference to the discussion of FIG. 7. Preferably, the video portions of the subscription program information signals are provided as a frequency multiplexed signal and the audio portions of the subscription program information signals are provided as a time division multiplexed signal. The communication signal, which is a multiplexed signal, is preferably composed of a plurality of command signals, the free television signals, a frequency multiplexed plurality of program information video signal portions and a time division multiplexed plurality of program information signal audio portions.

It should, of course, be understood that, if desired, the enire composite program information signal could be transmitted as a time division multiplexed signal instead of as separate audio and video portions as being described in the example hereinafter. In such instance, the composite time division multiplexed program information signal plurality could be operated on in the same fashion as described hereinafter with respect to the time division multiplexed program information sinal audio portion plurality.

Referring now to FIG. 8, a typical command control network, such as network 44, capable of providing subscription program selection wherein the subscripotion program information signal audio portions are contained in a time division multiplexed signal and the subscription program information video signals are contained in a frequency multiplex signal, is shown. As was previously mentioned with reference to FIG. 1, the input to the command control network 44 is provided via the cable distribution system associated with the various television display devices 38 and 40, by way of example, which is operatively connected to multiplexer 34 via path 36. This multiplexed communication signal is provided to a signal separation means 200 via the cable distribution system. More particularly, the multiplexed communication signal is supplied to a conventional demultiplexer 202 wich initially demultiplexes the communication signal. The initially demultiplexed communication signal is supplied to a conventional free TV signal pass band filter 204 which passes only the free TV signals which are preferably contained in the frequency band pertaining to the normally used conventional television channels. These signals are passed through a conventional amplifier 206 and therefrom to the associated television display device 40 via signal path 104. Demultiplexer 202 also provides the initially demultiplexed communication signal to another conventional pass band filter 208 which is preferably designed to pass only the band of frequencies associated with the subscription or pay television video signal portions, which signals are preferably in a frequency range other than that of the normally used television channels. The output of the pay TV filter 208, which is a frequency multiplexed plurality of video signal portions, is provided through a conventional amplifier 210 to a conventional mixer 212 as one input thereto.

As shown and preferred in FIG. 8, selection of the desired program information signal video portion is accomplished manually by means of a conventional rotary switch 214 and a plurality of conventional mixing frequency oscillators, three such oscillators 216, 218 and 220 being shown by way of example. Of course, if desired, such program selection can be accomplished in the manner previously described with reference to FIG. 1. Each of the associated mixing frequency oscillators 216, 218 and 220 preferably provides a mixing signal at a frequency which when mixed with the plurality of program information signal video portions supplied to mixer 212 will provide the selected program information signal video portion at the frequency of the common display channel, which frequency is preferably different from both the mixing frequency and the pre-mixing frequencies of the program information signal video portions. The output of rotary switch 214, which is the selected mixing frequency signal, is supplied to the other input of mixer 212. The output of mixer 212 is preferably operatively connected to a conventional fixed frequency filter 222, such as a bandpass filter designed to pass only signals at the frequency of the common display channel and to reject all other signals. The output of the fixed frequency filter 222, which is the selected program information signal video portion, is supplied to one input of another conventional mixer 224 for mixing with the appropriate selected corresponding audio portion thereof to provide the composite selected program information signal to the associated TV display device 40 via path 104.

The selection of the proper associated program information signal audio portion shall now be described. The initially demultiplexed communication signal output of demultiplexer 202 is also supplied to a conventional command signal filter and detector 226 and a conventional subscription or pay program information signal audio portion pass band filter and detector 228. Each of these filters is preferably designed to pass only the command signals (filter 226) and the audio portions of the program information signals (filter 228), respectively. As was previously mentioned, the audio portions of the program information signals are preferably contained in a time division multiplexed signal having an associated frequency band which is different from the associated frequencies of the normally used conventional television channels, as is the frequency range assigned to the command signals. Thus, the output of the command signal filter and detector 226, which is provided via path 230, comprises solely the plurality of command signals and the output of filter 228, which is provided via path 232, comprises solely the time division multiplexed subscription program information signal audio portion plurality.

The time division multiplexed program information signal voice or audio portions, as was previously mentioned with reference to FIG. 7, are preferably provided as a serial bit digital signal. The time division multiplexed digital signal output of filter 228 is, therefore, preferably operatively connected to a digital sampling means, such as a circulating shift register 234, via path 232 for demultiplexing the time division multiplexed digital signal to provide a digital signal output which corresponds to the selected program information signal audio portion. The output of the conventional circulating shift register 234 is preferably operatively connected to a conventional digital-to-analog converter and hold network 236, such as one utilizing JK flip-flops for memory between samples which control the output level in conjunction with a binary scaling resistor ladder network. The output of the digital-to-analog converter and hold network 236, which stores the information between samples, is operatively connected via path 238 through a conventional audio FM modulator 239 to one input to mixer 224, this audio information signal portion being provided to mixer 224 via signal path 238. The modulator 239 enables the mixing of the audio signal with the RF video signal in mixer 224. The selected audio portion is combined in mixer 224 with the selected video portion of the selected program information signal to provide a composite selected program information signal to the associated television display device 40 via path 104.

The circulating shift register 234 is controlled by means of an unload control pulse provided via path 240 from a frequency selection control signal generation network 242 wherein the frequency selection control signal is the unload pulse provided to the circulating shift register 234, this pulse operating on the time division multiplexed digital signal to provide the selected program information signal audio portion.

It should be understood that throughout the specification and claims the term "operating on" can be utilized in an analog or digital fashion such as in mixing (FIG. 2) or gating (FIG. 8). As long as the resultant output is dependent upon both input signals then each input signal is deemed to be "operating on" the other as defined above.

The frequency selection control signal is provided from the frequency selection control signal generating means 242 as was previously mentioned. Preferably, the frequency selection control signal generating means 242 includes a means for decoding the plurality of command signals provided from command signal filter 226 via path 230. As was previously mentioned with reference to FIG. 2, the command signal preferably includes an identifier portion and a command information portion and is preferably provided to the frequency selection control signal generating means as a serial bit digital signal via path 230. The decoder is preferably a conventional serial-to-parallel shift register 244 which provides a parallel bit output comprising the identifier portion of the command signal via path 246 and the command information portion of the command signal via path 248.

As was also previously mentioned with respect to the description of the embodiment shown in FIG. 2, each command control network 44 preferably has an associated unique identity code so as to be uniquely addressable by the computer 46. The identifier portion of the command signal provided via path 246 is operatively connected to a conventional digital comparator 250 which compares the identifier portion with the unique identity code assigned to the particular command and control network 44 and provides an enable output signal via path 252 only when there is a match; that is, only when the associated command and control network 44 is being addressed by the computer 46. This enable signal is provided to the enable input of a conventional AND gate 254. The other input to gate 254 is the command information portion, which is preferably a parallel bit signal containing time information and command information, the command information indicating the appropriate audio portion of the signal to be selected and the time information indicating a particular time slot in the time division multiplexed signal in which this information is contained. The command information is provided to another conventional digital comparator 256 via path 258 and the time information is provided to the comparator 256 via path 260 to provide a frequency selection control signal sample pulse or unload pulse to shift register 234 via path 240 when the command information signal corresponds to the time information signal indicating that the proper selected program information signal audio portion is present in the circulating shift register 234 for sampling, the register 234 being unloaded to converter-and-hold network 236 when the sample pulse is provided thereto.

It should be noted that the use of a separate demultiplexer 86 (FIG. 2) or 202 (FIG. 8) to initially demultiplex the communication signal prior to the normal demultiplexing function of the associated filters 88, 92 and 96 of signal separation or demultipleximg means 80 or filters 204, 208, 226 and 228 of signal separation means 200 may be omitted, if desired, if the received communication signal can easily be demultiplex in this fashion. Thus, although demultiplexers 86 and 202 are shown in FIGS. 2 and 8, respectively, they are preferably omitted from the normal command control network.

OPERATION

Now the operation of the communication system 20 of the present invention shall be described, first with reference to the operation of the secure subscription communication system portion 22 when the subscription program information signals are transmitted either as a frequency multiplexed composite signal or as a separate frequency multiplexed video portion plurality and a separate time division multiplexed audio portion plurality from which the appropriate selected portions are subsequently combined into a composite signal, and thereafter with reference to the premises access monitoring portion 24 of the communication system.

As was previously mentioned, the secure subscription communication system 22 of the present invention enables both conventional program information and subscription program information to be displayed on a conventional television display device without the necessity for internally modifying the television device itself. A plurality of subscription programs, such as ten channels, are simultaneously transmitted from a central source, these signals having been transmitted in the embodiment shown in FIG. 2 as a frequency multiplexed signal. For purposes of explanation, it shall be assumed that the system is utilized in an institutional environment such as a hotel. Furthermore, we shall assume that the hotel is in the New York City metropolitan area and channel 6 is utilized as the common display channel for the communication system.

In order to utilize the system 22, the user dials up the computer 46 to select a desired program from the plurality of subscription programs available. If desired, the computer may control a conventional playback tape recorder device which provides a prerecorded voice to the user requesting that he dial in his room number for billing purposes and thereafter dial in the selected program number and time of performance. This "dialing in" is preferably accomplished by means of either keyboard 64 of the conventional touchtone telephone desk set provided in the room, such as telephone 56. The telephone input information is routed through the conventional switchboard 60 and therefrom through a conventional moder 62 which converts the telephone signals into computer compatible digital signals which are supplied to computer 46. It should be noted that all times when the television 38 or 40 is tuned to channel 6, it preferably receives no television displayed thereover supplied from the conventional cable or master antenna associated with the cable distribuition system. The subscription program information signals, as was previously mentioned, are each at different frequencies from each other and from the common display channel frequency, in this instance channel 6, so that when these signals are supplied to the television receiver without any frequency modification, they will not be displayed due to the conventional filtering associated with the television display device. Furthermore, since the subscription program information signals are preferably at frequencies different from any of the television display channels, this information will not be displayable on any of the television channels without modification.

At the appropriate selected time chosen by the user, which has previously been supplied to the computer 46 by the user in the above manner, the computer provides a command signal output which may be a plurality of command signals when more than one television display is to display a slelected program at the same time. For purposes of this example, we shall assume that two different subscription programms are to be displayed substantially simultaneously, one on television 38 and the other on television 40. The plurality of command signals provided by computer 46 at the designated time are preferably digital signals which are modulated onto an RF command frequency by modulator 64 prior to being supplied to multiplexer 34 where the free television signals supplied via path 32, the subscription program information signal supplied via path 50 and the command signals are multiplexed into a multiplexed communication signal containing these various portions. This signal is supplied through the cable distribution system to the command control networks 42 and 44 associated with the television displays 38 and 40, respectively.

Now the operation of command and control network 42 associated with television 38 shall be typically described, the operation of all such associated networks being substantially the same. The multiplexed communication signal provided via path 36 to the cable distribution network is supplied to the demultiplexer 86 which demultiplexes this multiplexed communication signal. As was previously mentioned, the command signals are contained in one frequency band, the subscription program information signals are contained in another frequency band, and the free television signals are contained in still another frequency band. Accordingly, the demultiplexed communication signal is supplied to the band pass filters 88, 92 and 96 which only pass the free television signals, subscription program information signals, and command signals, respectively. The free television signals provided through amplifier 100 to the common display channel signal path 102, and therefrom to the television 38, are normally transmitted to the television except when a subscription program is to be displayed. The subscription program information band output of filter 92 is provided to the mixer 106 where it is mixed with a signal at the appropriate mixing frequency so that the resultant beat frequency of the selected program information signal will be the frequency of the common display channel while the associated frequencies of the remaining program information signals will still not be that of the common display channel, or any other display channel on the television display device.

In order to provide the signal at the appropriate mixing frequency, which signal is termed the frequency selection control signal, the command signal output of filter 96, which, as was previously mentioned, is preferably a serial bit digital signal, is supplied to serial-to-parallel shift register 112 which decodes or separates the command signal into its identifier portion supplied via path 116 and its command information portion supplied via path 114.

As was previously mentioned, each command control network 42, 44 has an associated unique address or identity. The identifier portion of the command signal is utilized to determine if the particular command control network 42 is being addressed by the computer 46. This is accomplished in conventional fashion by means of digital comparator 118 which compares the identifier portion of the command signal with the assigned identity code for the associated command control network 42 and provides an output signal via path 120 when these signals match. This output signal is an enable signal for gate 122 whose information input is the command information signal portion provided via path 114. Thus, when an enable signal is provided to gate 122 indicating that the associated command and control network 42 is being addressed by the computer 46, gate 122 passes the command information portion to synthesizer 126 via path 124.

Now describing the operation of the synthesizer 126 in greater detail. Generally describing the operation of the digital frequency synthesizer shown in FIG. 3, the voltage controlled oscillator 134 is tuned over a frequency range (the range of mixing frequencies) by means of the phase locked loop 132. The frequency selected is held fixed with crystal accuracy through the digitally variable feedback system in the servo loop. The reference frequency derived from the crystal reference oscillator 130 is compared with a signal resulting from the voltage controlled oscillator 134 output, the servo system nulling when these two frequencies are equal. The voltage controlled oscillator 134 output passes through the digital pulse counter or divider 138 which divides the voltage controlled oscillator 134 frequency to a lower frequency. By varying the counter 138 range, a corresponding variation in division ratio is produced. In this manner, the command signal information portion controls the synthesizer output frequency, a change in division ratio generating a change in feedback frequency, which is nulled by the servo varying the voltage controlled oscillator 134 output frequency. In this manner the single, crystal reference oscillator 130 may be used as a reference to generate the plurality of frequencies, each of which inherently has the same accuracy and stability of the crystal reference oscillator 130.

The input to the variable frequency divider 138 is the frequency output signal from the voltage controlled oscillator 134. The output of counter 138 is, therefore, a signal whose frequency is the frequency of the voltage controlled oscillator output signal divided by the division ratio "N" of the counter 138, the division ratio being an externally programmed number determined by the command signal information portion and which is correlated to the desired frequency output. At equilibrium in the servo system, the two signals into the phase detector 140, that is the reference signal supplied by oscillator 130 and the same frequency and are separated by a fixed phase differential. Accordingly, the frequency divider 138 output is a signal at a frequency which is a constant which is equivalent to the reference oscillator 130 frequency. Accordingly, once the division ratio has been chosen for divider 138 in accordance with the command signal information portion, the frequency of the output of voltage controlled oscillator 134 must shift to satisfy the servo equilibrium. If desired, a coarse tuning voltage may be used to adjust the frequency of the voltage controlled oscillator 134 to within the acquisition range of the phase locked loop 132. In this instance, when the voltage controlled oscillator 134 frequency is within this pull-in range, the phase locked loop 132 will acquire and hold the oscillator 134 at the proper frequency. The loop filter 148, together with the gain control of the phase-to-DC voltage converter 146, provides the proper pull-in and hold-in phase loop characteristics.

As was previously mentioned, preferably the frequency divider 138 utilized in synthesizer 126, is a down counter arranged in decimal digits. The counter 138 is initially loaded with a number corresponding to the frequency desired, this number being provided as the command signal information portion. Each alternate zero crossing of the voltage controlled oscillator 134 is converted to a pulse which decreases the counter 138 by one count. When the counter 138 reaches "all zero" state, an output signal is generated. The counter 138 is then reloaded with frequency information, and the cycle begins again.

If desired, a conventional synthesizer such as one employing harmonic generators and mixers to generate a plurality of frequencies from each source may be utilized in place of the preferred digital frequency synthesizer.

As was previously mentioned, the phase detector 140 is preferably a digital type, such as the AND gate 144 shown in FIG. 6 although, if desired, a two-transformer balanced demodulator may be utilized as the phase detector 140. With respect to the digital phase detector 144, phase difference in the digital sense is preferably determined by applying two digital signals as inputs to the NAD gate 44, the output of the gate being a pulse, the width of which is determined by the relative zero crossings of the two input signals. Thus, the reference oscillator 130 output signal is preferably a digital signal supplied to AND gate 144 via path 143 as is the output of divider 138 supplied to gate 144 via path 136. The pulse width of the phase detector 140 output is linearally proportional to the phase difference between these two signals, phase difference being the spacing between the zero crossings of the digital signal. The conversion of this phase signal output of detector 140 to a DC voltage which controls the frequency of the voltage controlled oscillator 134 is accomplished by means of converter 146. This conversion may preferably be accomplished by operating a linear integration pulse duration sampler 174 over a period equal to the pulse width. At the instant the pulse modulated signal changes state, the DC voltage of the integrator 174 is equal to the pulse width. The DC signal is sampled and stored in a memory device and, thus, the integrator may be reset, and the cycle can be repeated. If the new pulse width is the same as the last pulse width, the DC level in the memory unit associated with sampler 174 will remain unchanged between like samples, thus providing a DC signal without AC components.

Alternatively, if desired, this phase signal-to-DC voltage conversion may be accomplished by low pass filtering of the pulse width modulated signal via filter network 170. The low pass filter 170 passes the DC component of this signal and provides attenuation of the high frequency components, sufficient sections of low pass filtering being utilized to provide fast roll-off without introducing excessive phase shift. Furthermore, the filter network 170 preferably includes a rejection filter means at each of the undesired frequencies in the digital signal such as the phase detector frequency and its harmonics. The amplifier 172 associated with the filter network 170 improves the filter response of the converter 146.

As was previously mentioned, the voltage controlled oscillator 134 frequency is controlled by the DC voltage applied to the oscillator 134. Such a typical conventional oscillator 134 is shown in FIG. 5 wherein varactor tuning is utilized to vary the frequency of the oscillator 134. Since the operation of oscillator 134, which is illustratively shown in FIG. 5 is a Clapp type oscillator, is conventional, it will not be described in greater detail hereinafter.

The appropriate mixing frequency provided by synthesizer 126 via path 128 as the tuned output of oscillator 134 is supplied to mixer 106 which provides the proper beat frequency for the selected program information signal. These signals are provided to filter 108 which rejects all signals except a signal at the common display channel frequency. Since the selected program information signal is now at this frequency, this signal will be passed by filter 108 to amplifier 110 and the balance of the signals rejected. This selected program information signal is provided via the common display channel signal path 102 to the television device 38 where it is displayed on the common display channel. Similarly, for television device 40, the command control network 44, which has a different unique indentifer, may simultaneously display a different selected program on the common display channel by means of having a different mixing frequency supplied to mixer 106 by the associated synthesizer 126 of network 44; thus, providing a different selected program information signal with the proper beat frequency equivalent to the common display channel signal frequency so that only this different selected program will be passed by filter 108 to the television device 40.

In addition to the subscription program information, if desired, the user may select locally generated "special" or "promotional" "free" television information for display on the common display channel. Such information may be selected by interaction with computer 46 in the manner previously described wherein the computer 46 provides a control signal to the conventional videotape memory device 72 for supplying this stored information to the appropriate television display instead of the ordinarily supplied conventional free television information supplied via path 32 or the subscription program information supplied via path 50. In addition, if desired, the user may obtain additional special information to be displayed on the common display channel by individually accessing the computer 46 disc memory 74. Preferably, data is composed in the auxiliary disc memory 74 associated with computer 46 in the form of frames, each frame representing one complete picture on the television screen. In this instance, the computer 46 is preferably programmed so that when it receives a particular instruction from the user's telephone 56 or 58, or keyboard 64, the computer 46 will retrieve the frame requested for subsequent display. The selected frame from disc memory 74 is provided to the conventional character generator 76 which converts this frame retrieval into the form of characters to be displayed on the television screen. The modulator 78 conventionally converts these characters into an RF television picture.

Together with this picture, the computer 46, on its command and control channel, via signal path 84, addresses the particular command control network 42 which will be receiving the picture in the manner previously described with reference to the operation of command control network 42 with respect to receipt of subscription program information. Similarly, computer 46, via command and control channel and signal path 84 associated with the particular command control network, addresses the particular command control network 42 which will be receiving the videotape memory 72 provided picture. The associated command and control network 42 channels the retrieved frame picture onto a conventional frame snatcher 79, such as a Lithocon silicon storage tube of the type manufactured by Princeton Electronic Products. The frame snatcher 79 has the capacity of remembering a single frame of television picture so that the computer 46 may transmit this one frame to the user's television and then may free itself from that television to service other users, the frame remaining in the frame snatcher 79 memory as long as the user does not desire to change it.

The operation of the command control network when the subscription program information signals are provided in a separate band of audio portions and a separate band of video portions which, when properly combined form the composite program information signals, wherein the audio portions are provided as a time division multiplexed signal and the video portions are provided as a frequency multiplexed signal, has already been described with reference to FIGS. 7 and 8 and, therefore, will not be described in greater detail hereinafter. Suffice it to say that both with respect to the embodiment shown in FIG. 8 and the embodiment shown in FIG. 2, the computer 46 preferably automatically bills the user for the service or selected program at the time the computer 46 provides the command signal to the associated command control network 42 or 44 to accomplish program selection. At this time, billing information is provided via path 70 to the local teletype billing device 68 and, if desired, to the central invoicing system via path 67.

Similarly, the basic operation of the premises access monitoring system 24 associated with the present invention has previously been described with reference to FIGS. 1, 2, 9, 10, 11 and 12, FIGS. 9 through 12 being directed to different embodiments of the security system 176–178 comprising the premises access monitoring system 24 and will not be described in greater detail hereinafter. Suffice it to say that the basic manner of operation of a typical security system, such as shown in FIG. 10, is that the user inserts the card to be read in the slot 406; the light emitting diode 420, transmitting modulated light to the fiber optic arrangement comprising light pipe 408*a* and its associated branches 410*a* through 418*a*, which, in turn, transmit this light to the card located in the slot 406. Wherever there is a hole in the card at the bit positions optically aligned with branches 410*a* through 418*a*, light is passed therethrough to the corresponding light pipe branches 410*b* through 418*b*. This light passing through the corresponding light pipes 410*b* through 418*b*, inclusive, is picked up by light pipes 410*c* through 418*c*, inclusive, and detected by the appropriate optically aligned phototransistors 424 through 432, inclusive, respectively, which generate electrical signals which are formated into a compatible digital signal by logic network 434. This signal is provided from the logic network 434 to the computer 46 via communication path 36 but is preferably temporarily stored, along with the unique identity of the monitored premises until the computer interrogates the particular premises.

If desired, the card reader in the present invention, such as card reader 300, 400 or 500 can be utilized for reading a card from either side of the door so as to determine whether an individual is entering or leaving the premises. This can be accomplished by having the card to be read inserted right side up upon entering the room and upside down upon leaving the room. One of the bit positions in this instance would be utilized to detect whether the card is right side up or upside down and the computer 46 could be programmed accordingly in conventional manner.

Suffice it to say with respect to the embodiment shown in FIG. 11, this reader 500 is similar to the reader shown in FIG. 10 with modifications thereto for providing additional security for the system so as to prevent unauthorized tampering with the system such as by an unauthorized entrant to the premises inserting a mirror between portions 502 and 504 so as to compromise or "fool" the security system. Thus, as was previously described, various selected bit positions are illuminated by light which has been polarized to change the polarization thereof with respect to other bit positions, an initial polarizer 528 being provided in front of light emitting diode 524 so as to provide a base line orientation for the polarization associated with card reader 500. The embodiment shown in FIG. 9 has been previously described with respect to the operation thereof and will not be described in greater detail hereinafter.

Similarly, the basic operation of the embodiment shown in FIG. 12 has been previously described and will not be described in greater detail hereinafter. Now that the basic operation of the premises access monitoring system 24 associated with the present invention has been described, the preferred manner of utilizing such a system shall be described in greater detail hereinafter.

Assuming the system 24 is utilized in an institution such as a hotel for security surveillance, the operation of this system is as follows.

When a guest checks into the hotel, the front desk clerk will provide him with an identification card selected at random from a batch of such cards. Before handing the guest this card, the clerk would insert the card into the card reader located at the front desk while at the same time keying in the guest's assigned room number, both of these pieces of information being supplied to the computer 46 which stores in its memory the guest's card number versus the assigned room number. Before entering the premises being monitored, the guest must insert his identification card into the card reader 300, 400, 500 or 280 depending on the embodiment utilized which reader transmits the identity code recorded on the card to the computer 46 via the two-way communication line 36. The command control network associated with this premises transmits its unique identity code which corresponds to the associated room number to the computer at this time. The computer 46 then compares the identity code read by the card reader 300, 400, 500 or 280 with the room number provided by the command and control network 42 against the identity code and room number stored in the computer memory. If they agree, no alert signal is provided.

As was previously mentioned, the status of the door to each premises is monitored either due to the optical alignment between portions 302 and 304 of reader 300, 402 and 404 of reader 400 or 502 and 504 of reader 500 or by a separate associated door position sensor 182, such as a microswitch operated by a position sensor which checks to see if the door has been opened. In such an instance, portion 304, 404 or 504 or sensor 182, which monitors the condition of the door, transmits a signal to the computer 46 via the twoway communication channel. If the information supplied by the card reader has indicated that the entrant to the room is properly identified, then no alert signal is provided. However, if the door is opened without the guest or user having properly been identified in that the identity code on his card is not the correct code or in that no identity code at all has been provided to the computer 46, the computer 46 will provide an alert signal to the security display device 188 which preferably displays the room number of the premises to which unauthorized entry has been made as well as sounding an audible alarm. It should be noted that, preferably, the card must be read before an indication is provided that the door has been opened and preferably this condition applies to both entry or egress from the premises.

By utilizing the communication system of the present invention, premises access monitoring is provided wherein the proper authorization for authorized entry to the monitored premises may be randomly varied and the system may not be easily compromised. Furthermore, both premises access monitoring and subscription program selection for these premises may be provided under supervision of a common computer wherein a plurality of substantially simultaneously transmitted different programs may be selectively displayed on a single common display channel on a plurality of different televisions in a subscription communication system while the user is simultaneously billed for the use at the time the use occurs. In addition, if desired, the security system of the present invention could be utilized to supply data relating to the status of conventional burglar or fire alarm detectors to a central computer.

It is to be understood that the above described embodiments of the invention are merely illustrative of the principles thereof and that numerous modifications and embodiments of the invention may be derived within the spirit and scope thereof.

What is claimed is:

1. A system for providing secure subscription communication and premises access monitoring wherein said system selectively provides a display of program information from a first multiplexed communication signal containing a plurality of different program information signals and at least one command signal, said system comprising at least a first display means for displaying said selected program information in response to one of said selected program information signals, said display means having a display signal path over which said program information signals are provided, a common display channel having an associated predetermined signal frequency and a common command signal path; a first control means operatively connected to said first display means via said display signal path; and a first condition responsive means operatively connected to said first control means via a common communication signal path, said first multiplexed communication signal being provided to said first control means via said communication signal path, said first condition responsive means providing said command signal; said first control means including an associated first signal separation means for separating said first multiplexed communication signal into said plurality of program information signals and said command signal, an associated program information selection control signal generating means operatively connected to said associated first signal separating means for providing a program selection control signal in response to an associated unique command signal from said first condition responsive means, said program selection control signal generating means associated with said first control means generating a first selection control signal in response to said first control means associated unique command signal, and an associated first signal operating means operatively connected to said associated first signal separating means and said program selection control signal generating means for operating on said plurality of program information signals with said associated program selection control signal for providing said selected one of said program information signals to said display means at said associated common display signal frequency via said display signal path, said first selection control signal operating on said plurality of program information signals to provide said selected program information signal to said first display means for providing said selected display, whereby a plurality of substantially simultaneously transmitted different programs may be selectively individually displayed on said common display channel; and said system further comprises means operatively connected to said first condition responsive means via said communication signal path to provide a first identity code input condition and a second access status input condition thereto, said first condition responsive means providing an alert output signal condition in response to said first and second input conditions when said input conditions are provided thereto and said first input condition does not correspond to a predetermined authorized identity code signal, whereby an alert to unauthorized entry of an access monitored premises may be provided.

2. A system in accordance with claim 1 wherein said access monitored premises has a means for obtaining physical access to said premises, said input condition providing means comprises an identity code input means operatively connected to said first condition responsive means via said communication signal path to provide said first identity code input condition and an access status monitoring means operatively connected to said first condition responsive means via said communication signal path to provide said second status input condition, said access status monitoring means comprising bistable means having an accessed condition and an unaccessed condition, said access status input condition being provided in said accessed condition, said bistable means being operatively connected to said physical access obtaining means and to said first condition responsive means via said communication signal path for providing said access status input condition thereto, and said identity code input means comprising card reader means, said identity code being contained on a card means insertable in said reader means, said reader means being operatively connected to said first condition responsive means via said communication signal path for providing said first input condition thereto in response to said identity code of an inserted card means, only one identity code corresponding to said predetermined authorized identity code signal.

3. A system in accordance with claim 1 wherein said input condition providing means comprises card reader means, said card reader means comprising at least a first and a second portion, said reader portions being separate and distinct from each other and spaced apart from one another, said spaced apart portions being optically interconnected with each other, said first portion having means therein for receiving an optically readable card means having an identity code contained thereon at a reading position, said identity code being optically readable, said second portion including means for illuminating said optically readable card means at said reading position, said first and second portions being optically aligned, at least one of said portions including means optically aligned with said reading position and responsive to said illuminated card means for providing a signal indicative of said optically readable identity code as said first identity code input condition, said signal providing portion being operatively connected to said first condition responsive means via said communication signal path for providing said first input condition thereto.

4. A system in accordance with claim 3 wherein said second portion includes means for modulating the output of said illuminating means for providing a modulated source of illumination for said card means.

5. A system in accordance with claim 4 wherein said second portion includes first means for polarizing the output of said illuminating means for providing a first predetermined initial polarization for said modulated source of illumination for said card means.

6. A system in accordance with claim 5 wherein said optically readable identity code comprises a plurality of optically readable information bits at said code reading position, each of said bits having a bit reading position, said first portion comprising a first fiber optic array having a fiber optic branch optically aligned with each of said bit reading positions and a fiber optic branch optically aligned with said source of illumination for illuminating each of said bit reading positions.

7. A system in accordance with claim 6 wherein at least one of said first fiber optic array branches includes second means for polarizing said initially polarized illumination provided to said branch for providing a second predetermined polarization thereto different from said initially provided polarization.

8. A system in accordance with claim 7 wherein said first portion further comprises a second fiber optic array having a plurality of fiber optic branches each optically aligned at one end with a corresponding branch of said first fiber optic array at said bit reading positions and spaced therefrom, said card means being insertable between said optically aligned first and second fiber optic arrays, said information bits being provided in response to the appearance gf apertures at said bit reading positions, said optically read information bits being provided through said second fiber optic array.

9. A system in accordance with claim 8 wherein said second portion includes means responsive to said illuminated card means for providing said signal indicative of said optically readable identity code, the opposite ends of said second fiber optic array branches being optically aligned with said responsive means for providing said optically read bits to said responsive means.

10. A system in accordance with claim 9 wherein said responsive means comprises at least one light filter means responsive to only said second predetermined polarization of said illumination, whereby an alert to unauthorized entry of an access monitored premises may be provided.

11. A system in accordance with claim 10 wherein said responsive means further comprises at least one other light filter means responsive to only said first predetermined polarization of said illumination.

12. A system in accordance with claim 3 wherein said second portion includes first means for polarizing the output of said illuminating means for providing a first predetermined initial polarization for said modulated source of illumination for said card means.

13. A system in accordance with claim 4 wherein said optically readable identity code comprises a plurality of optically readable information bits at said code reading position, each of said bits having a bit reading position, said first portion comprising a first fiber optic array having a fiber optic branch optically aligned with each of said bit reading positions and a fiber optic branch optically aligned with said source of illumination for illuminating each of said bit reading positions.

14. A system in accordance with claim 13 wherein said first portion further comprises a second fiber optic array having a plurality of fiber optic branches each optically aligned at one end with a corresponding branch of said first fiber optic array at said bit reading positions and spaced therefrom, said card means being insertable between said optically aligned first and second fiber optic arrays, said information bits being provided in response to the appearance of apertures at said bit reading positions, said optically read information bits being provided through said second fiber optic array.

15. A system in accordance with claim 3 wherein said illuminating means comprises first and second illuminating sources for illiminating said card means at said reading position, said optically readable identity code comprising a plurality of optically readable information bits at said code reading position, said first portion comprising a first fiber optic array having a fiber optic branch optically aligned with each of said bit reading positions and a fiber optic branch optically aligned with each of said sources of illumination in a first predetermined orientation for illuminating each of said bit positions; each illuminating source only illuminating a portion of the total plurality of bit reading positions.

16. A system in accordance with claim 15 wherein said first portion further comprises a second fiber optic array having a plurality of fiber optic branches each optically aligned at one end with a corresponding branch of said first optic array at said bit reading positions and spaced therefrom, said card means being insertable between said optically aligned first and second fiber optic arrays, said information bits being provided in response to the appearance of apertures at said bit reading positions, said optically read information bits being provided through said second fiber optic array; and said second portion includes means responsive to said illuminated card means for providing said signal indicative of said optically readable identity code, the opposite ends of said second fiber optic array branches being optically aligned with said responsive means in a different predetermined orientation from said first predetermined orientation for providing said optically read bits to said responsive means in accordance with said different orientation whereby space diversity for said information bits may be provided.

17. A system in accordance with claim 16 wherein said second portion includes means for modulating the output of at least one of said illuminating sources.

18. A system in accordance with claim 17 wherein said second portion further includes switch means operatively connected between said modulating means and each of said illuminating sources for alternatively connecting said modulating means to one of said illuminating means for alternatively modulating the output thereof whereby time diversity for said information bits is provided.

19. A system in accordance with claim 3 wherein said illuminating means comprises a light emitting diode.

20. A premises access monitoring system for providing monitoring information to a condition responsive means via a communication signal path comprising means operatively connected to said condition responsive means via said communication signal path to provide a first identity code input condition and a second status input condition thereto, said condition responsive means enabling access to an access monitored premises while providing an alert output signal condition in response to said first and second input conditions when said input conditions are provided thereto and said first input condition does not correspond to a predetermined authorized identity code signal whereby an alert to unauthorized entry of said access monitored premises may be provided, said input condition providing means comprising card reader means, said card reader means comprising at least a first and a second portion, said reader portions being separate and distinct from each other and spaced apart from one another, said spaced apart portions being optically interconnected with each other, said first portion having means therein for receiving an optically readable card means having an identity code contained thereon at a reading position, said identity code being optically readable, said second portion including means for illuminating said optically readable card means at said reading position and means for modulating the output of said illuminating means with a predetermined time varying modulation function for providing a time varying modulated source of illumination for said card means, said first and second portions being optically aligned, at least one of said portions including means optically aligned with said reading position and responsive to said illuminated card means time varying modulation function for providing a signal indicative of said optically readable identity code as said first identity code input condition, said signal providing portion being operatively connected to said condition responsive means via said communication signal path for providing said first input condition thereto.

21. A premises access monitoring system for providing monitoring information to a condition responsive means via a communication signal path comprising means operatively connected to said condition responsive means via said communication signal path to provide a first identity code input condition and a second status input condition thereto, said condition responsive means providing an alert output signal condition in response to said first and second input conditions when said input conditions are provided thereto and said first input condition does not correspond to a predetermined authorized identity code signal whereby an alert to unauthorized entry of an access monitored premises may be provided, said input condition providing means comprising card reader means, said card reader means comprising at least a first and a second portion, said reader portions being separate and distinct from each other and spaced apart from one another. said spaced apart portions being optically interconnected with each other, said first portion having means therein for receiving an optically readable card means having an identity code contained thereon at a reading position, said identity code being optically readable, said second portion including means for illuminating said optically readable card means at said reading position, means for modulating the output of said illuminating means with a predetermined time varying modulation function for providing a time varying modulated source of illumination for said card means and first means for polarizing the output of said illuminating means for providing a first predetermined initial polarization for said modulated source of illumination for said card means, said first and second portions being optically aligned, at least one of said portions including means optically aligned with said reading position and responsive to said illuminated card means time varying function for providing a signal indicative of said optically readable identity code as said first identity code input condition, said signal providing portion being operatively connected to said condition responsive means via said communication signal path for providing said first input condition thereto.

22. A system in accordance with claim 21 wherein said optically readable identity code comprises a plurality of optically readable information bits at said code reading position, each of said bits having a bit reading position, said first portion comprising a first fiber optic array having a fiber optic branch optically aligned with each of said bit reading positions and a fiber optic branch optically aligned with said source of illumination for illuminating each of said bit reading positions.

23. A system in accordance with claim 22 wherein at least one of said first fiber optic array branches includes second means for polarizing said initially polarized illumination provided to said branch for providing a second predetermined polarization thereto different from said initially provided polarization.

24. A system in accordance with claim 23 wherein said first portion further comprises a second fiber optic array having a plurality of fiber optic branches each optically aligned at one end with a corresponding branch of said first fiber optic array at said bit reading positions and spaced therefrom, said card means being insertable between said optically aligned first and second fiber optic arrays, said information bits being provided in response to the appearance of apertures as said bit reading positions, said optically read information bits being provided through said second fiber optic array.

25. A system in accordance with claim 24 wherein said second portion includes means responsive to said illuminated card means for providing said signal indicative of said optically readable identity code, the opposite ends of said second fiber optic array branches being optically aligned with said responsive means for providing said optically read bits to said responsive means.

26. A system in accordance with claim 25 wherein said responsive means comprises at least one light filter means responsive to only said second predetermined polarization of said illumination, whereby an alert to unauthorized entry of an access monitored premises may be provided.

27. A system in accordance with claim 26 wherein said responsive means further comprises at least one other light filter means responsive to only said first predetermined polarization of said illumination.

28. A premises access monitoring system for providing monitoring information to a condition responsive means via a communication signal path comprising means operatively connected to said condition responsive means via said communication signal path to provide a first identity code input condition and a second status input condition thereto, said condition responsive means providing an alert output signal condition in response to said first and second input conditions when said input conditions are provided thereto and said first input condition does not correspond to a predetermined authorized identity code signal whereby an alert to unauthorized entry of an access monitored premises may be provided, said input condition providing means comprising card reader means, said card reader means comprising at least a first and a second portion, said reader portions being separate and distinct from each other and spaced apart from one another, said spaced apart portions being optically interconnected with each other, said first portion having means therein for receiving an optically readable card means having an identity code contained thereon at a reading position, said identity code being optically readable, said second portion including means for illuminating said optically readable card means at said reading position and means for modulating the output of said illuminating means with a predetermined time varying modulation function for providing a time varying modulated source of illumination for said card means, said first and second portions being optically aligned, said optically readable identity code comprising a plurality of optically readable information bits at said code reading position, each of said bits having a bit reading position, said first portion comprising a first fiber optic array having a fiber optic branch optically aligned with each of said bit reading positions and a fiber optic branch optically aligned with said source of illumination for illuminating each of said bit reading positions, at least one of said portions including means optically aligned with said first fiber optic array and responsive to said illuminated card means time varying modulation function for providing a signal indicative of said optically readable identity code as said first identity code input condition, said signal providing portion being operatively connected to said condition responsive means via said communication signal path for providing said first input condition thereto.

29. A system in accordance with claim 28 wherein said first portion further comprises a second fiber optic array having a plurality of fiber optic branches each optically aligned at one end with a corresponding branch of said first fiber optic array at said bit reading positions and spaced therefrom, said card means being insertable between said optically aligned first and second fiber optic arrays, said information bits being provided in response to the appearance of apertures at said bit reading positions, said optically read information bits being provided through said second fiber optic array.

30. A premises access monitoring system for providing monitoring information to a condition responsive means via a communication signal path comprising means operatively connected to said condition responsive means via said communication signal path to provide a first identity code input condition and a second status input condition thereto, said condition responsive means providing an alert output signal condition in response to said first and second input conditions when said input conditions are provided thereto and said first input condition does not correspond to a predetermined authorized identity code signal whereby an alert to unauthorized entry of an access monitored premises may be provided, said input condition providing means comprising card reader means, said card reader means comprising at least a first and a second portion, said reader portions being separate and distinct from each other and spaced apart from one another, said spaced apart poritons being optically interconnected with each other, said first portion having means therein for receiving an optically readable card means having an identity code contained thereon at a reading position, said identity code being optically readable, said second portion including means for illuminating said optically readable card means at said reading position and means for modulating the output of said illuminating means with a predetermined time varying modulation function for providing a time varying modulated source of illumination for said card means, said first and second portions being optically aligned said illuminating means comprising first and second illuminating sources for illuminating said card means at said reading position, said optically readable identity code comprising a plurality of optically readable information bits at said code reading position, said first portion comprising a first fiber optic array having a fiber optic branch optically aligned with each of said bit reading positions and a fiber optic branch optically aligned with each of said sources of illumination in a first predetermined orientation for illuminating each of said bit positions, each illuminating source only illuminating a portion of the total plurality of bit reading positions, said modulating means modulating the output of at least one of said illuminating sources, at least one of said portions including means optically aligned with said first fiber optic array and responsive to said illuminated card means time varying modulation function for providing a signal indicative of said optically readable identity code as said first identity code input condition, said signal providing portion being operatively connected to said condition responsive means via said communication signal path for providing said first input condition thereto.

31. A system in accordance with claim 30 wherein said first portion further comprises a second fiber optic array having a plurality of fiber optic branches each optically aligned at one end with a corresponding branch of said first optic array at said bit reading positions and spaced therefrom, said card means being insertable between said optically aligned first and second fiber optic arrays, said information bits being provided in response to the appearance of apertures at said bit reading positions, said optically read information bits being provided through said second fiber optic array; and said second portion includes means responsive to said illuminated card means for providing said signal indicative of said optically readable identity code, the opposite ends of said second fiber optic array branches being optically aligned with said responsive means in a different predetermined orientation from said first predetermined orientation for providing said optically read bits to said responsive means in accordance with said different orientation whereby space diversity for said information bits may be provided.

32. A system in accordance with claim 31 wherein said second portion further includes switch means operatively connected between said modulating means and each of said illuminating sources for alternatively connecting said modulating means to one of said illuminating means for alternatively modulating the output thereof whereby time diversity for said information bits is provided.

* * * * *